(12) United States Patent
Hasegawa et al.

(10) Patent No.: US 10,187,336 B2
(45) Date of Patent: Jan. 22, 2019

(54) TRANSMISSION SYSTEM, COMMUNICATIONS CONTROL APPARATUS, TRANSMISSION TERMINAL, COMMUNICATIONS METHOD, AND TRANSMISSION METHOD

(71) Applicants: Takashi Hasegawa, Kanagawa (JP); Takahiro Asai, Kanagawa (JP)

(72) Inventors: Takashi Hasegawa, Kanagawa (JP); Takahiro Asai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 260 days.

(21) Appl. No.: 14/872,446

(22) Filed: Oct. 1, 2015

(65) Prior Publication Data
US 2016/0099893 A1 Apr. 7, 2016

(30) Foreign Application Priority Data

Oct. 7, 2014 (JP) ................................. 2014-206078

(51) Int. Cl.
*H04L 12/18* (2006.01)
*H04L 12/58* (2006.01)

(52) U.S. Cl.
CPC ........ *H04L 51/046* (2013.01); *H04L 12/1818* (2013.01)

(58) Field of Classification Search
CPC .............. H04L 29/06; H04L 29/08576; H04L 29/08072; H04L 29/0809; H04L 29/06095; H04L 1/08; H04J 13/0048; H04J 13/18; H04J 13/12; H04B 1/707; H04N 7/15; H04N 7/147; H04N 7/152; H04N 7/142; H04N 7/141
USPC ....................................................... 709/227
See application file for complete search history.

(56) References Cited

U.S. PATENT DOCUMENTS

| | | | |
|---|---|---|---|
| 9,319,631 B2 * | 4/2016 | Kato | H04N 7/15 |
| 2004/0006642 A1 * | 1/2004 | Jang | H04L 29/12254 709/245 |
| 2007/0019609 A1 * | 1/2007 | Anjum | H04L 29/12254 370/349 |

(Continued)

*Primary Examiner* — Mahran Y Abu Roumi
(74) *Attorney, Agent, or Firm* — Oblon, McClelland, Maier & Neustadt, L.L.P.

(57) ABSTRACT

Disclosed is a transmission system including a first transmission terminal and a second transmission terminal in which the first transmission terminal transmits data to the second transmission terminal. The transmission system includes a first communications connector configured to connect first data communications between the first transmission terminal specified by first identification information and the second transmission terminal specified by second identification information, a determination part configured to refer to registered information registering third identification information in association with the first identification information of the first transmission terminal, acquire the third identification information in association with the first identification information, and determine whether the third identification information is included in transmission data transmitted by the first transmission terminal, and an addition part configured to add first information indicating that determination is made on the transmission data by the determination part.

9 Claims, 22 Drawing Sheets

(56) References Cited

U.S. PATENT DOCUMENTS

| | | | | |
|---|---|---|---|---|
| 2010/0049873 A1* | 2/2010 | Nerst | ................ | H04L 29/12103 |
| | | | | 709/245 |
| 2010/0199320 A1* | 8/2010 | Rannanathan | ......... | H04N 7/147 |
| | | | | 725/109 |
| 2013/0222528 A1* | 8/2013 | Hinohara | .............. | H04M 3/567 |
| | | | | 348/14.08 |
| 2013/0223292 A1* | 8/2013 | Okuyama | ........... | H04L 65/1069 |
| | | | | 370/261 |
| 2013/0242033 A1* | 9/2013 | Kato | ........................ | H04N 7/15 |
| | | | | 348/14.08 |
| 2013/0242038 A1* | 9/2013 | Umehara | ............ | H04L 12/1818 |
| | | | | 348/14.12 |
| 2013/0271557 A1* | 10/2013 | Kato | ........................ | H04N 7/15 |
| | | | | 348/14.07 |
| 2014/0064185 A1* | 3/2014 | Abraham | .............. | H04W 40/02 |
| | | | | 370/328 |
| 2014/0240450 A1* | 8/2014 | Morita | ................... | H04N 7/147 |
| | | | | 348/14.12 |
| 2014/0375753 A1* | 12/2014 | Uchiyama | ................ | H04N 7/15 |
| | | | | 348/14.08 |

* cited by examiner

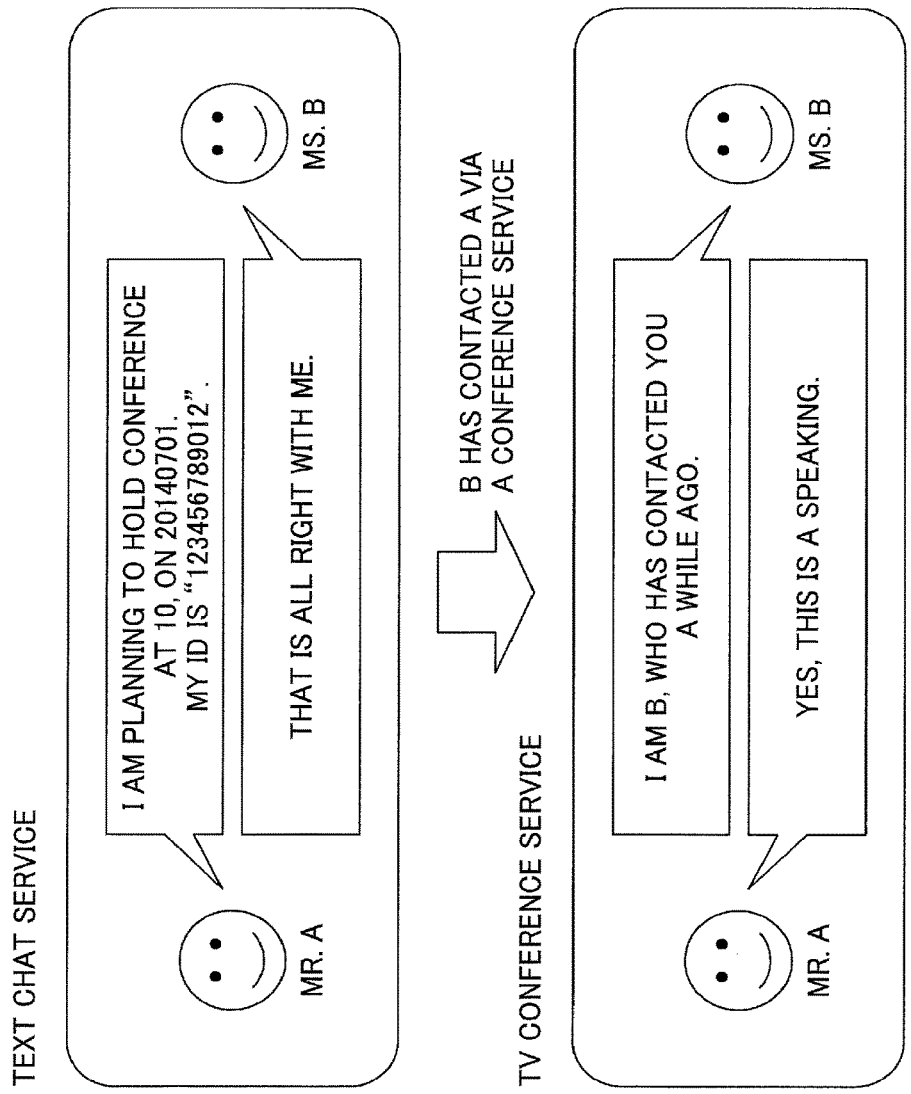

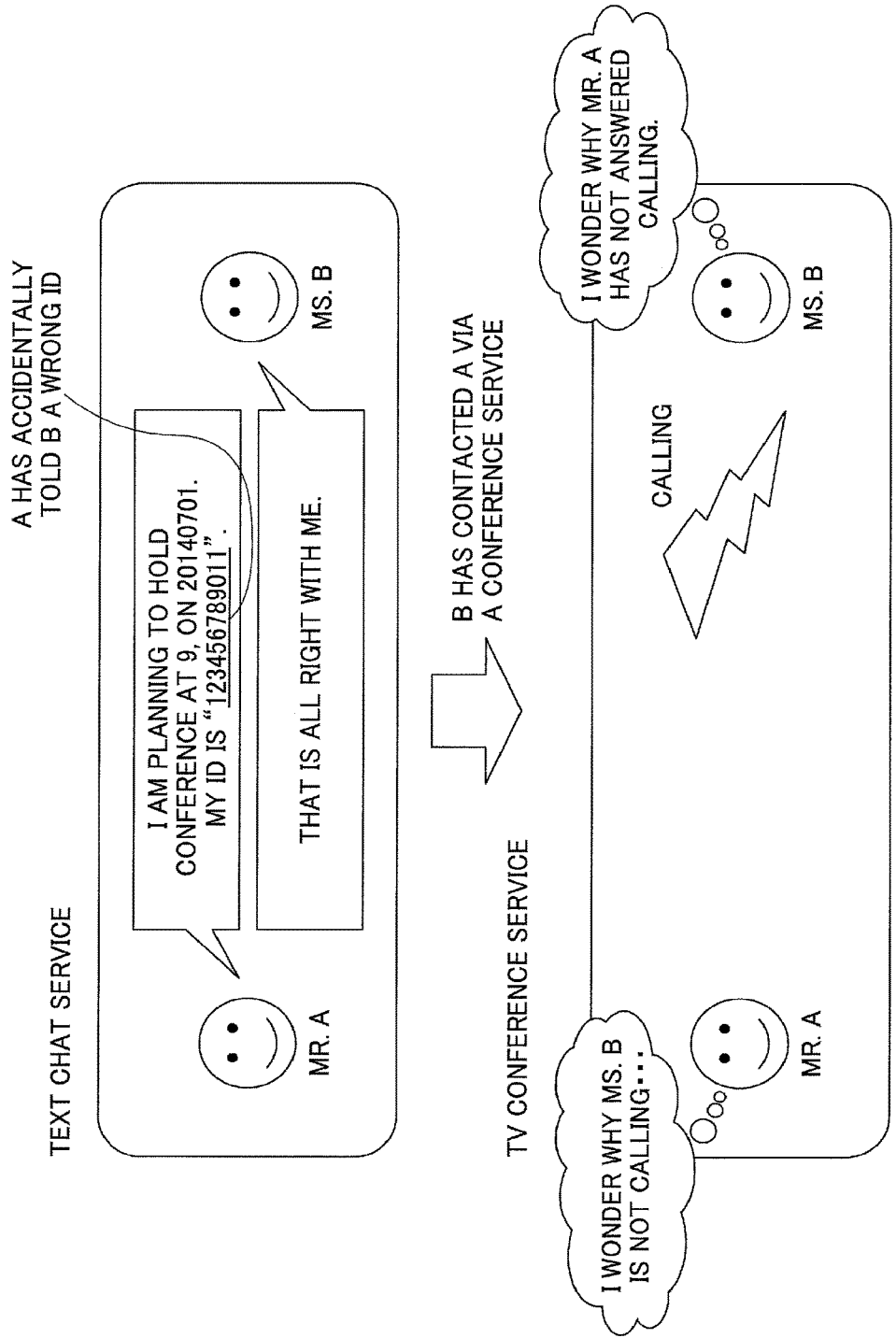

FIG.9

| SESSION ID | RELAY APPARATUS ID | REQUEST SOURCE COMMUNICATION ID | DESTINATION COMMUNICATION ID |
|---|---|---|---|
| se1 | 111a | 02aa | 01ab |
| se2 | 111b | 01ba | 01ca |
| se3 | 111d | 01bb | 01da |
| ... | ... | ... | ... |

FIG. 10A

| COMMUNICATIONS ID | DESTINATION LIST |
|---|---|
| 01aa | 01ab@TV CONFERENCE MANAGEMENT SYSTEM, ... |
| 01ab | 01aa@TV CONFERENCE MANAGEMENT SYSTEM, 02AA@TEXT CHAT MANAGEMENT SYSTEM, ... |
| ... | ... |
| 01ba | 01bb@TV CONFERENCE MANAGEMENT SYSTEM, 01ca@TV CONFERENCE MANAGEMENT SYSTEM, ... |
| 01bb | 01ba@TV CONFERENCE MANAGEMENT SYSTEM, 02BB@TEXT CHAT MANAGEMENT SYSTEM, ... |
| ... | ... |
| 02aa | 02ab@TV CONFERENCE MANAGEMENT SYSTEM |
| 02ab | 02aa@TV CONFERENCE MANAGEMENT SYSTEM |

FIG. 10B

| USER ID | DESTINATION LIST |
|---|---|
| 02AA | 02AB@TEXT CHAT MANAGEMENT SYSTEM, 01ab@TV CONFERENCE MANAGEMENT SYSTEM, ... |
| 02AB | 02AA@TEXT CHAT MANAGEMENT SYSTEM, ... |
| ... | ... |
| 02BA | 02BB@TEXT CHAT MANAGEMENT SYSTEM, ... |
| 02BB | 02BA@TEXT CHAT MANAGEMENT SYSTEM, 01bb@TV CONFERENCE MANAGEMENT SYSTEM, ... |
| ... | ... |

FIG.11

| SERVICE NAME | MANAGEMENT SYSTEM NAME |
|---|---|
| TV CONFERENCE | TV CONFERENCE MANAGEMENT SYSTEM |
| TEXT CHAT | TEXT CHAT MANAGEMENT SYSTEM |
| ... | ... |

FIG.12A

| COMMUNICATIONS ID | PASSWORD |
|---|---|
| 01aa | aaaa |
| 01ab | abab |
| 01ba | baba |
| ... | ... |
| 02aa | aabb |
| 02ab | bbaa |
| ... | ... |

FIG.12B

| USER ID | PASSWORD |
|---|---|
| 01AA | AAAA |
| 01AB | ABAB |
| 01BA | BABA |
| ... | ... |
| 02AA | AABB |
| 02AB | BBAA |
| ... | ... |

FIG.13

| TERMINAL TYPE NAME | SERVICE NAME |
|---|---|
| TV CONFERENCE-SPECIFIC | TV CONFERENCE |
| GENERAL-PURPOSE | TV CONFERENCE, TEXT CHAT |
| CHAT-SPECIFIC | TEXT CHAT |
| ... | ... |

FIG.14

| COMMUNICATIONS ID /USER ID | NAME | OPERATING STATUS | REPORTING DESTINATION | RECEIVED DATE AND TIME | IP ADDRESS |
|---|---|---|---|---|---|
| 01aa | AA CONFERENCE TERMINAL | ONLINE (COMMUNICATIVE) | — | 2013.11.10.13:40 | 1.2.1.3 |
| 01ab | AB CONFERENCE TERMINAL | OFFLINE | — | 2013.11.09.12:00 | 1.2.1.4 |
| ... | ... | ... | ... | ... | ... |
| 01ba | BA CONFERENCE TERMINAL | ONLINE (ENGAGED) | — | 2013.11.10.13:45 | 1.2.2.3 |
| 01bb | BB CONFERENCE TERMINAL | ONLINE | — | 2013.11.10.13:50 | 1.2.2.4 |
| ... | ... | ... | ... | ... | ... |
| 02AA | AA MOBILE TERMINAL | ONLINE (COMMUNICATIVE) | TV CONFERENCE MANAGEMENT SYSTEM | 2013.11.25.14:30 | 1.4.1.1 |
| 02AB | AB MOBILE TERMINAL | ONLINE (COMMUNICATIVE) | — | 2013.11.25.14:29 | 1.4.1.2 |
| ... | ... | ... | ... | ... | ... |
| 02BA | BA MOBILE TERMINAL | OFFLINE | — | 2013.11.24.13:30 | 1.5.1.1 |
| 02BB | BB MOBILE TERMINAL | ONLINE (COMMUNICATIVE) | TV CONFERENCE MANAGEMENT SYSTEM | 2013.11.15.14:25 | 1.5.1.2 |
| ... | ... | ... | ... | ... | ... |

FIG.15

| MANAGEMENT ID | COMMUNICATIONS ID | USER ID |
|---|---|---|
| 1 | 01aa | 01AA |
| 2 | 01ab | 01AB |
| 3 | 01ba | 01BA |
| 4 | 01bb | 01BB |
| 5 | 02aa (123456789012) | 02AA |
| 6 | 02ab | 02AB |
| 7 | 02ba | 02BA |
| 8 | 02bb | 02BB |

TRANSMISSION SYSTEM, COMMUNICATIONS CONTROL APPARATUS, TRANSMISSION TERMINAL, COMMUNICATIONS METHOD, AND TRANSMISSION METHOD

BACKGROUND OF THE INVENTION

1. Field of the Invention

The disclosures discussed herein relate to a transmission system, a communications control apparatus, a transmission terminal, a communications method, and a transmission method.

2. Description of the Related Art

Transmission systems have been widely used for performing communications between multiple terminal apparatuses via a communications network such as the Internet. There are known in the art services employing transmission systems such as a text chat service or a TV conference service.

For example, in the text chat service, one of users inputs a text message in a terminal with a keyboard to transmit the text message, and a communications partner serving as the other user receives the text message displayed on a display. Thus, the communications partner may be able acquire desired information from the text message displayed on the display.

Hence, the text chat service allows the receiver terminal to access useful information included in the text message by utilizing its capability of transmitting a text message (e.g., see Japanese Laid-open Patent Publication No. 2004-274427, hereinafter referred to as "Patent Document 1"). Patent Document 1 discloses a communications system capable of converting personal information into a predetermined format to transmit the converted personal information to a communications partner, and a terminal of the communications partner registers the personal information into a database.

In the related art text chat service, whether information included in the text message is correct is not determined.

FIG. 1A is a diagram illustrating an example of a text message transmitted in the text chat service. As illustrated in FIG. 1A, Mr. A transmits a text message including his ID (123456789012) to Ms. B. This ID is necessary identification information for Ms. B to specify Mr. A in order to contact Mr. A, for example, in a TV conference service. Hence, when the ID is correct, Ms. B is able to specify Mr. A to converse with Mr. A.

By contrast, as illustrated in FIG. 1B, there may be a case where Mr. A transmits the text message by including a wrong ID (123456789011) as his ID. In such a case, Ms. B tries to contact Mr. A using the wrong ID so that Ms. B is unable to contact Mr. A. In the meantime, Mr. A awaiting a call from Ms. B is unable to receive the call from Ms. B.

RELATED ART DOCUMENT

Patent Document

Patent Document 1: Japanese Laid-open Patent Publication No. 2004-274427

SUMMARY OF THE INVENTION

Accordingly, it is a general object in one embodiment of the present invention to provide a technology capable of allowing a receiver side to determine whether information included in the received (transmitted) data is accurate that substantially obviates one or more problems caused by the limitations and disadvantages of the related art.

According to an aspect of embodiments, there is provided a transmission system including a first transmission terminal and a second transmission terminal, the first transmission terminal transmitting data to the second transmission terminal. The transmission system includes a first communications connector configured to connect first data communications between the first transmission terminal specified by first identification information and the second transmission terminal specified by second identification information; a determination part configured to refer to registered information registering third identification information in association with the first identification information of the first transmission terminal, acquire the third identification information in association with the first identification information, and determine whether the third identification information is included in transmission data transmitted by the first transmission terminal; and an addition part configured to add first information indicating that determination is made on the transmission data by the determination part.

Other objects, features and advantages of the present invention will become more apparent from the following detailed description when read in conjunction with the accompanying drawings.

BRIEF DESCRIPTION OF THE DRAWINGS

FIGS. 1A and 1B are diagrams illustrating examples of text messages transmitted via a text chat service;

FIG. 9 is a diagram illustrating an example of a session management table;

FIGS. 10A and 10B are diagrams illustrating examples of destination list management tables of the TV conference management system and the text chat management system;

FIG. 11 is a diagram illustrating an example of a service management table;

FIGS. 12A and 12B are diagrams illustrating examples of authentication management tables;

FIG. 13 is a diagram illustrating an example of a terminal type table;

FIG. 14 is a diagram illustrating an example of an ID management table;

FIG. 15 is a diagram illustrating an example of a user identification information management table;

FIG. 20 is a diagram illustrating an example of a flowchart of the text chat management system verifying the communications ID or the like;

DETAILED DESCRIPTION OF THE PREFERRED EMBODIMENTS

Figure 2:
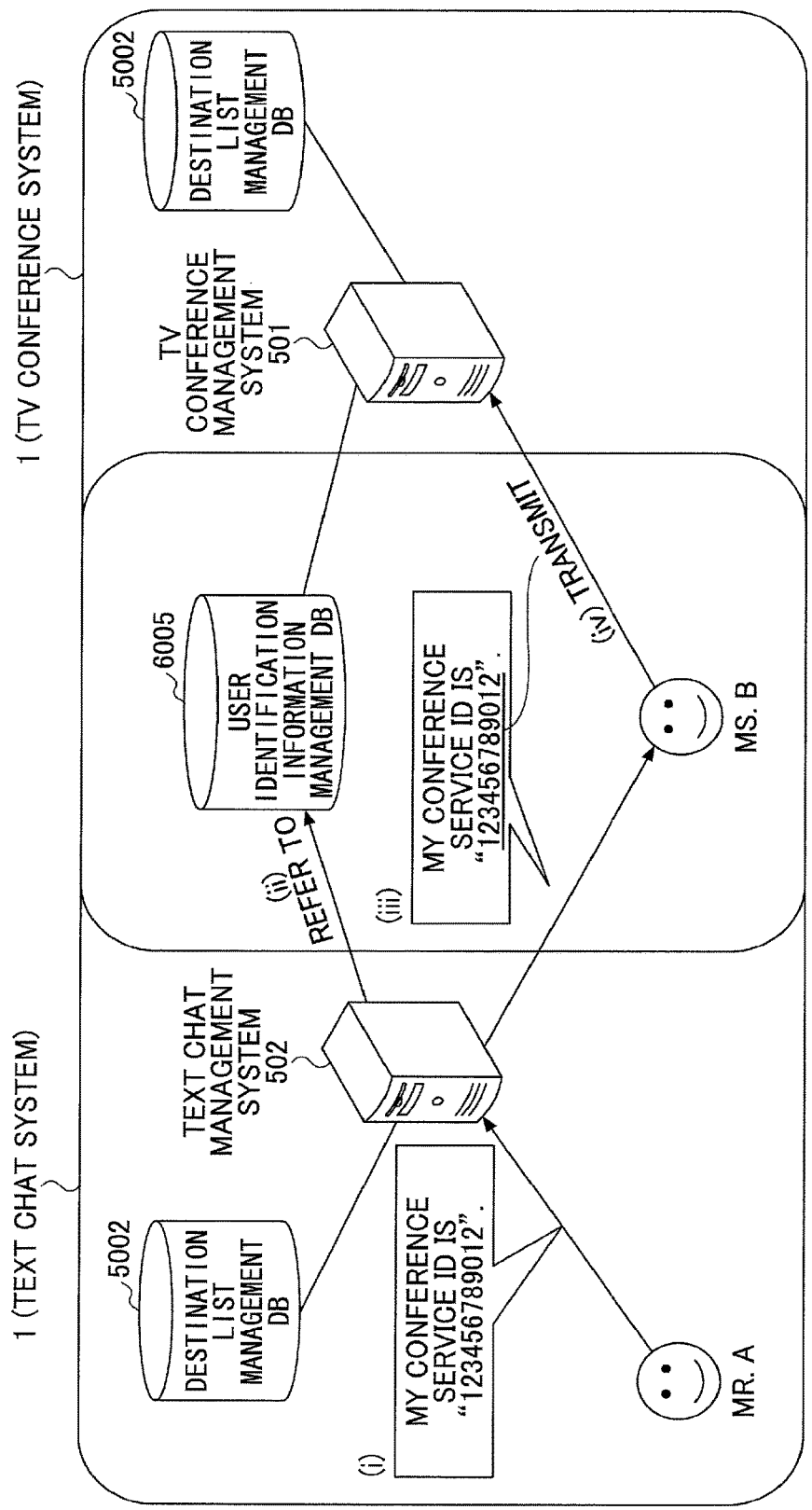
FIG. 2 is a schematic diagram illustrating an example of a linkage between a text chat system and a TV conference system.

In the following, a description is given of embodiments with reference to the accompanying drawings.
Verification of Information Included in Text Message In the following, an illustrating is given, with reference to FIG. 2, of a method of verifying information including a text message. FIG. 2 is a schematic diagram illustrating an example of a linkage between a text chat system and a TV conference system.

In the text chat system, a text chat management system $50_2$ is configured to manage calling control, and in the TV conference system, a TV conference management system $50_1$ is configured to manage calling control. Users A and B are both capable of accessing services provided by the text chat management system $50_2$ and the TV conference management system $50_1$. However, the users are identified by the user IDs in the text chat management system $50_2$ whereas the users are identified by the communications IDs in the TV conference management system $50_1$.

In the text chat management system $50_2$ of the embodiment, whether the communications IDs included in the text messages are correct is verified as follows.

(i) When the user A transmits a text message (an example of transmission data) to the user B via the text chat management system $50_2$, the user A has included the communications ID of the user A himself in the text message for holding a TV conference. The user B needs to have the communications ID for holding the TV conference with the user A.

(ii) The text chat management system $50_2$ refers to a user identification information management DB 6005 including the user IDs in association with the respective communications IDs. Since the user IDs of the users A and B are already known, it is possible to read the communications ID in association with the user ID of the user A from the user identification information management DB 6005.

(iii) When the communications ID included in the text message matches the communications ID read from the user identification information management DB 6005, the text chat management system $50_2$ embeds a link for starting the TV conference and transmits it to the user B.

(iv) The user B is able to request the TV conference management system $50_1$ to start the TV conference by selecting this link.

The link is embedded in the communications ID that is verified as the communications ID being associated with the user A. Hence, the user B is able to start communications with the user A via the TV conference management system $50_1$ differing from the text chat management system $50_2$. The link is not embedded in the communications ID failing to match the communications ID of the user A. Hence, the user B is able to take an appropriate action, such as inquiring of the user A about the communications ID of the user A, in consideration of the possibility of the communications ID received being a wrong communications ID. Thus, the presence of absence of the link indicates information as to whether the communications ID is verified.

Note that there is an example or a technology for embedding a link when an electronic mail message includes a phone number or email address. However, this kind of technology merely focuses on a format description of the phone number or email address (the number of digits or @ mark), and does not verify whether the phone number or the email address is correct.

Further, the communications ID in the text message is displayed with an underline or with highlight by embedding the link in the communications ID as described in the embodiment, providing an effect of making it easy for the user serving as a transmission partner to identify the communications ID.

Figure 3:
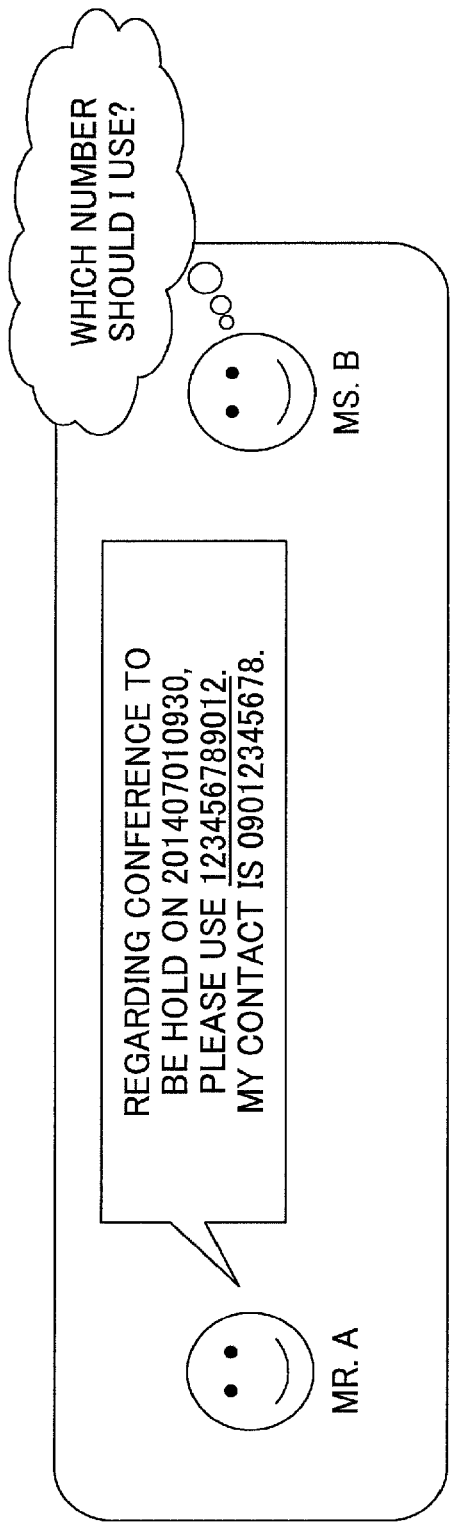
FIG. 3 is a diagram illustrating an example of a text message transmitted by a user A and received by a user B.

FIG. 3 is a diagram illustrating an example of a text message transmitted by the user A and received by the user B. As illustrated in FIG. 3, the text message may include two or more numbers similar to the communications ID. In the example of FIG. 3, the text message includes three numbers "201407010930", "123456789012", and "09012345678". However, the link is embedded in the communications ID "123456789012", which makes it easy for the user B to identify the communications ID.

TERMINOLOGY FOR USE IN EMBODIMENTS

ID of TV conference management system $50_1$: A communications ID (used in authentication of a user when the user logs into the TV conference management system $50_1$). Transmission terminals are identified with the communications IDs to transmit or receive image data and sound data between the transmission terminals. The communications ID is an example of third identification information or fourth identification information.

ID of text chat management system $50_2$: A user ID (used in authentication of a user when the user logs into the text chat management system $50_2$). Transmission terminals are identified with the user IDs to transmit or receive text messages between the transmission terminals. The user ID is an example of first identification information or second identification information. Further, the text chat management system $50_2$ is an example of a communication control apparatus or an information processing apparatus.

The IDs of the embodiment indicate identification information such as a language, characters, symbols, or various types of marks used for uniquely identifying a transmission terminal or a user of the transmission terminal. Further, the communications ID may be identification information composed of a combination of at least two of the above language, characters, symbols, and marks.

In addition, embedding a link indicates attaching other information in association with the communications ID. Other information may be used for communicatively connecting the transmission terminals 10 to a Web page or a server indicated by the other information with a function such as a browser. For example, when the text message is described in HTML, the HREF attribute for <a> tags known in the art is used as a description method for embedding a link. When the text message is described in XML, the XLINK known in the art is used as a description method for embedding a link. Note that a method of embedding a link is not limited to those examples described above, and may be selected and set in accordance with a format description of the text message or a communications protocol.

Overall Configuration

Figure 4:
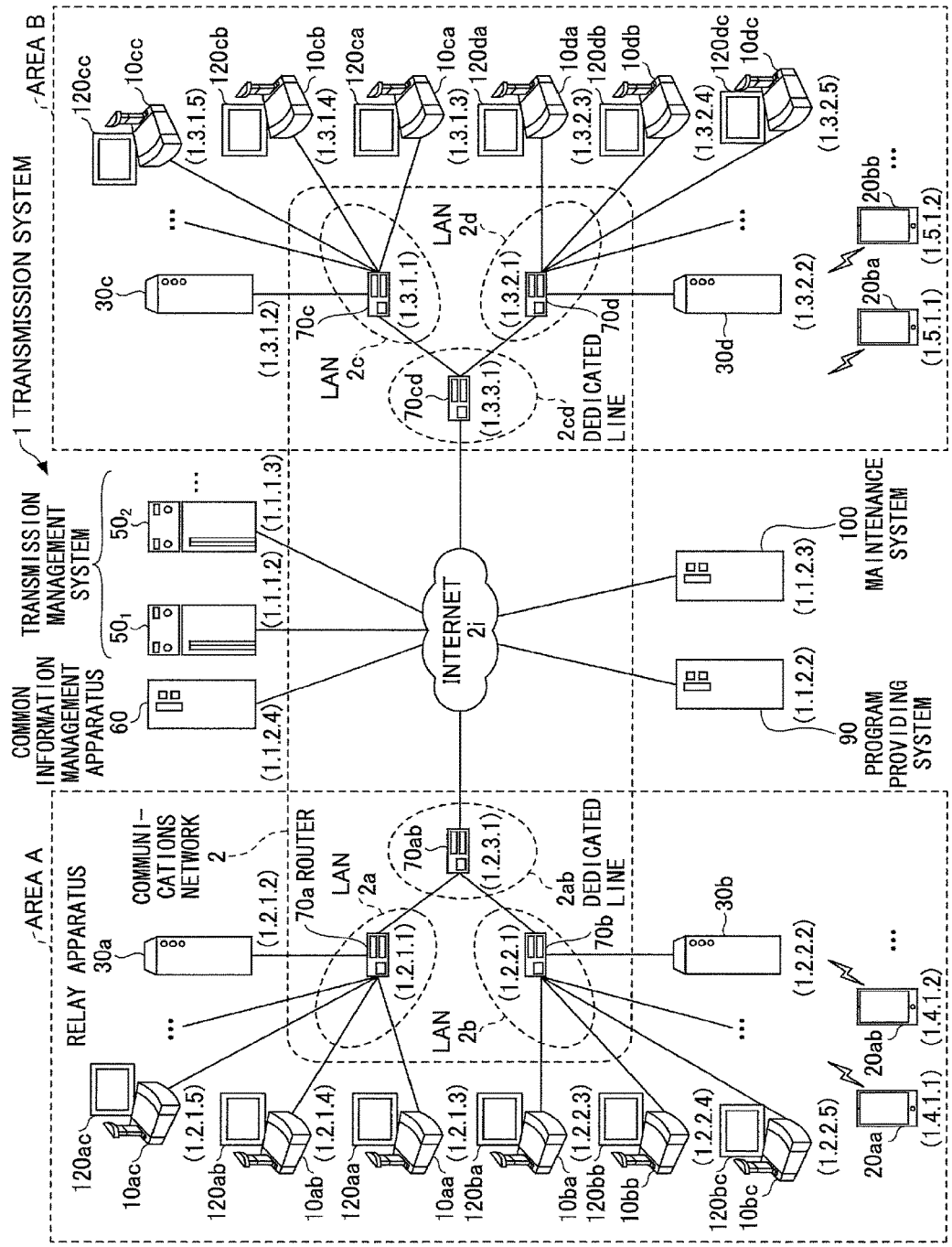
FIG. 4 is a schematic diagram illustrating an example of a transmission system according to an embodiment.

FIG. 4 is a schematic diagram illustrating an example of a transmission system according to an embodiment.

Examples of the transmission system include a data providing system configured to transmit content data in one direction from one transmission terminal to another transmission terminal via a transmission management system, or a communications system configured to communicate information, emotions, and the like between two or more transmission terminals via a transmission management system. The communications system is configured to mutually communicate information, emotions, and the like between two or more communication terminals (corresponding to the "transmission terminals") via a communication management system (corresponding to the "transmission management system"). Examples of such a communications system include a TV conference system, a video telephony system, and an audio teleconference system, a voice telephony system, a PC (personal computer) screen sharing system, a text chat system, and the like.

In the present embodiment, the transmission system is described as an example of a communications system based on the assumption of a system conducting a TV conference or text chat. That is, the communications system of the embodiment indicates a transmission system capable of providing a TV conference service and a text chat service. Further, in this embodiment, a transmission management system is described based on the assumption of the TV conference management system $50_1$ and the text chat management system $50_2$ serving as an example of the communication management system. Similarly, a transmission terminal is described based on the assumption of a terminal serving as an example of a communication terminal capable of performing one or both of the TV conference and the text chat.

That is, the transmission terminal or the transmission management system of the embodiment is not only applied to the above-described transmission system but is also applied to other communications system, data providing system, and the like.

The transmission system 1 illustrated in FIG. 4 includes multiple transmission terminals (10$aa$, 10$ab$, 20$aa$, 20$ab$, . . . ), respective displays (120$aa$, 120$ab$, . . . ) for the transmission terminals (10$aa$, 10$ab$, . . . ), multiple relay apparatuses (30$a$, 30$b$, . . . ), multiple transmission management system ($50_1$, $50_2$, . . . ), a common information management apparatus 60, a program providing system 90, and a maintenance system 100.

The transmission terminals 10 are configured to transmit or receive image data and sound data as an example of content data. That is, the transmission terminals 10 are TV conference terminals capable of the transmission terminals 10 may be TV conference service-specific terminals (TV conference-specific terminals). Hereinafter, the transmission terminals 10 may represent the TV conference-specific terminals 10. The TV conference-specific terminals 10 may be managed by the transmission management system $50_1$ configured to manage calling control of the TV conference service. Note that the TV conference-specific terminal 10 is not necessarily limited to a terminal having hardware itself being specifically configured for the TV conference service but includes a terminal having general-purpose hardware capable of utilizing applications specifically configured for the TV conference service.

Further, when the communication management system serves as the audio teleconference system, or the voice telephony system, sound data may be used as an example of content data to be transmitted and received for utilizing the voice telephony service.

On the other hand, the transmission terminals 20 are configured to transmit or receive image data and sound data, or text data as an example of content data. That is, the transmission terminals 20 are terminals capable of utilizing the TV conference or the text chat. In this embodiment, the transmission terminal 20 may be a general-purpose mobile terminal such as a tablet terminal, a mobile phone, and a smartphone capable of utilizing both the TV conference service and the chat service unless otherwise specified. The transmission terminal 20 may be configured to at least utilize the text chat service and is not necessarily configured to utilize the TV conference service. Note that the transmission terminals 20 may, for example, be wirelessly connected to a communications network 2 via a mobile phone communications network or WiFi (wireless fidelity). Hereinafter, the transmission terminals 20 may represent the mobile terminals 20. The mobile terminals 20 may be managed by the transmission management system $50_2$ configured to manage calling control of the text chat service.

Note that the above-described TV conference specific terminals 10 and the mobile terminals 20 are examples of the communication terminals. Examples of the communication terminals include various types of electronic apparatuses such as gaming apparatuses, general-purpose PC terminals, car navigation terminals installed on vehicles, projection apparatuses such as projectors, electronic whiteboards, wearable terminals in addition to conference-specific terminals, tablet terminals, mobile phones, and smartphones.

Note that any one of the TV conference-specific terminals (10$aa$, 10$ab$, . . . ) may be represented by a "TV conference-specific terminal 10", and any one of the mobile terminals (20$aa$, 20$ab$, . . . ) may be represented by a "mobile terminal 20".

Further, any one of the displays (120$aa$, 120$ab$, . . . ) may be represented by a "display 120", and any one of the relay apparatuses (30$a$, 30$b$, . . . ) may be represented by a "relay apparatus 30". Further, any one of the transmission management systems ($50_1$, $50_2$, . . . ) may be represented by a "transmission management system 50". Further, one of the TV conference-specific terminal 10 and the mobile terminal 20 serving as a terminal that requests the other one of the TV conference-specific terminal 10 and the mobile terminal 20 to start a TV conference or the text chat may be represented by a "request source terminal", and a terminal serving as a request destination may be represented by a "destination terminal".

Further, in the transmission system 1, a management information session is established between the request source terminal and the destination terminal for transmitting and receiving various types of management information via the transmission management system 50. In addition, a session for transmitting and receiving content data via the relay apparatus 30 is established between the request source terminal and the destination terminal. Note that when the content data transmitted and received between the request source terminal and the destination terminal are text data alone, a session is established via the transmission management system 50 between the request source terminal and the destination terminal, or a session may directly be established between the request source terminal and the destination terminal.

Note that in this embodiment, when the TV conference-specific terminal 10 serves as the request source terminal, a session is established via the transmission management system $50_1$. On the other hand, when the mobile terminal 20 serves as the request source terminal, a session is established via the transmission management system $50_2$. Specifically, calling control of the TV conference-specific terminal 10 utilizing the TV conference service alone is managed by the transmission management system $50_1$ whereas calling control of the mobile terminal 20 utilizing the text chat service is managed by the transmission management system $50_2$. In this embodiment, calling control for different services may be managed by different transmission management systems 50. Hence, calling control for any one of the services may be managed by a corresponding one of the transmission management systems 50. In the following, the management system $50_1$ is represented by a "TV conference management system $50_1$", and the management system $50_2$ is represented by a "text chat management system $50_2$".

The relay apparatuses 30 illustrated in FIG. 4 are configured to relay content data between the TV conference-specific terminals 10 and the mobile terminals 20.

The transmission management systems 50 are configured to perform login authentication, calling status management and destination list management of the transmission terminals, and calling status management of the relay apparatuses 30. Further, the above-described management is performed by each of the transmission management systems 50 configured to manage calling control of respective services. Specifically, the login authentication, the calling status management and the destination list management of the TV conference-specific terminals 10, the calling statuses of the relay apparatuses 30, and the like are managed by the TV conference management system $50_1$. On the other hand, the login authentication, the calling status management and the destination list management of the mobile terminals 20, the calling statuses of the relay apparatuses 30, and the like are managed by the text chat management system $50_2$. Note that as described later, status information of the transmission terminals such as calling status management is mutually reported to one another and between the associated transmission management systems 50.

The common information management apparatus 60 includes a DB (database) server or the like configured to manage information common between the transmission management systems 50. The common information management apparatus 60 may be a storage device such as a network storage configured to store information common between the transmission management systems 50. Note that in this embodiment, the common information management apparatus 60 is provided separately from the transmission management systems 50. However, the common information management apparatus 60 may be provided in each of the transmission management systems 50.

Routers (70a, 70b, 70c, 70d, 70ab, and 70cd) are configured to select an optimal one of routes for the content data. Note that in the following, any one of the routers (70a, 70b, 70c, 70d, 70ab, and 70cd) is represented by a "router 70".

The program providing system 90 includes a later-described HD (hard disk) 204, and is configured to store terminal-specific programs for causing the TV conference-specific terminals 10 or the mobile terminals 20 to implement various types of functional components or causing the TV conference-specific terminals 10 or the mobile terminals 20 to function as various types of components, and to transmit the terminal-specific programs to the TV conference-specific terminals 10 or the mobile terminals 20. Note that the TV conference-specific terminals 10 and the mobile terminals 20 are configured to transmit different terminal programs, respectively. Specifically, the program providing system 90 is configured to transmit terminal-specific programs for utilizing the TV conference service to the TV conference-specific terminals 10, and to transmit terminal-specific programs for utilizing the TV conference service and the text chat service to the mobile terminals 20. Note that the program providing system 90 may alternatively be configured to transmit the terminal-specific programs for utilizing the text chat service alone to the mobile terminals 20.

The HD 204 of the program providing system 90 is configured to further store relay apparatus-specific programs for causing the relay apparatuses 30 to implement various types of functional components or causing the relay apparatuses 30 to function as various types of components, and to transmit the relay apparatus-specific programs to the relay apparatuses 30. Further, the HD 204 of the program providing system 90 is configured to further store transmission management programs for causing the transmission management systems 50 to implement various types of functional components or causing the transmission management systems 50 to function as various types of components, and to transmit the transmission management programs to the transmission management systems 50. The HD 204 of the program providing system 90 is configured to further store information management programs for causing the common information management apparatus 60 to implement various types of functional components or causing the common information management apparatus 60 to function as various types of components, and to transmit the information management programs to the common information management apparatus 60.

The maintenance system 100 is a computer configured to perform maintenance, management, or support on one or more of the TV conference-specific terminals 10, the mobile terminals 20, the relay apparatuses 30, the transmission management systems 50, the common information management apparatus 60, and the program providing system 90. For example, when the maintenance system 100 is located domestically, and the TV conference-specific terminals 10, the mobile terminals 20, the relay apparatuses 30, the transmission management systems 50, the common information management apparatus 60, and the program providing system 90 are located abroad, the maintenance system 100 remotely performs maintenance, management, support, and the like on one or more of the TV conference-specific terminals 10, the mobile terminals 20, the relay apparatuses 30, the transmission management systems 50, the common information management apparatus 60, and the program providing system 90 via the communications network 2. Further, the maintenance system 100 may perform maintenance such as the management of model numbers, manufacturer's serial numbers, customers, maintenance and inspection, the malfunction history, and the like on one or more of the TV conference-specific terminals 10, the mobile terminals 20, the relay apparatuses 30, the transmission management systems 50, the common information management apparatus 60, and the program providing system 90 without being intervened by the communication network 2.

The TV conference-specific terminals (10aa, 10ab, 10ac, . . . ), the relay apparatus 30a, and the router 70a are connected to one another via a LAN 2a such that the TV conference-specific terminals (10aa, 10ab, 10ac, . . . ), the relay apparatus 30a, and the router 70a may be in communications with one another. The TV conference-specific terminals (10ba, 10bb, 10bc, . . . ), the relay apparatus 30b, and the router 70b are connected to one another via a LAN 2b such that the TV conference-specific terminals (10ba, 10bb, 10bc, . . . ), the relay apparatus 30b, and the router 70b may be in communications with one another. Moreover, the LAN 2a and the LAN 2b are connected via a dedicated line 2ab including a router 70ab such that the LAN 2a and the LAN 2b may be in communications with each other. The LAN 2a and the LAN 2b are constructed within a predetermined area A. For example, the predetermined area A may be Japan, the LAN 2a may be constructed within a Tokyo Office, and the LAN 2b may be constructed within an Osaka Office. Further, the mobile terminals (20aa, 20ab, . . . ) are utilized in the area A.

Meanwhile, the TV conference-specific terminals (10ca, 10cb, 10cc, . . . ), the relay apparatus 30c, and the router 70c are connected to one another via a LAN 2c such that the TV conference-specific terminals (10ca, 10cb, 10cc, . . . ), the relay apparatus 30c, and the router 70c may be in communications with one another. The TV conference-specific terminals (10da, 10dd, 10dc, . . . ), the relay apparatus 30d, and the router 70d are connected to one another via a LAN 2d such that the TV conference-specific terminals (10da, 10dd, 10dc, . . . ), the relay apparatus 30d, and the router 70d may be in communications with one another. Moreover, the LAN 2c and the LAN 2d are connected via a dedicated line 2cd including a router 70cd such that the LAN 2c and the LAN 2d may be in communications with each other. The LAN 2c and the LAN 2d are constructed within a predetermined area B. For example, the predetermined area B may be the United States of America, the LAN 2c may be constructed within a NY Office, and the LAN 2d may be constructed within a Washington, D.C. Office. Further, the mobile terminals (20ba, 20bb, . . . ) are utilized in the area B.

The area A and the area B are connected via the Internet 2i from the routers 70ab and 70cd, respectively, such that the area A and the area B may be in communications with each other.

Note that the TV conference-specific terminals 10 are not necessarily connected by a dedicated line, and may directly connected to the Internet 2i.

In addition, the transmission management systems 50, the program providing system 90, and the maintenance system 100 are connected via the Internet 2i to the TV conference-specific terminals 10, the mobile terminals 20, the relay apparatuses 30, and the common information management apparatus 60 such that the transmission management systems 50, the program providing system 90, and the maintenance system 100 may be in communications with the TV conference-specific terminals 10, the mobile terminals 20, the relay apparatuses 30, and the common information management apparatus 60. The transmission management systems 50, the common information management apparatus 60, and the program providing system 90 may be installed within the area A or the area B, or may be installed within an area other than these areas A and B.

Note that the LAN 2a, the LAN 2b, the dedicated line 2ab, the Internet 2i, the dedicated line 2cd, the LAN 2c, and the LAN 2d form the communications network 2 in this embodiment. The communications network 2 not only includes wired communications but partially includes wireless communications such as WiFi (Wireless Fidelity) or Bluetooth (registered trademark).

In FIG. 4, a combination of four numbers provided beneath each of the TV conference-specific terminals 10, the mobile terminals 20, the relay apparatuses 30, the transmission management systems 50, the common information management apparatus 60, the routers 70, the program providing system 90, and the maintenance system 100 simply represents an IP address using IPv4. For example, the IP address of the TV conference-specific terminal 10aa is "1.2.1.3". Further, the IP address may be IPv6 instead of IPv4; however, the IPv4 is employed for simplifying the illustration.

Note that each of the TV conference-specific terminals 10 and the mobile terminals 20 may be used for communications between two or more offices, and communications between different rooms within the same office, in addition to communications within the same room, communications between indoor and outdoor, and communications between outdoor and outdoor. When the TV conference-specific terminals 10 and the mobile terminals 20 used outdoor may perform communications via wireless communications such as a mobile communications network.

TV Conference-Specific Terminal

Figure 5:
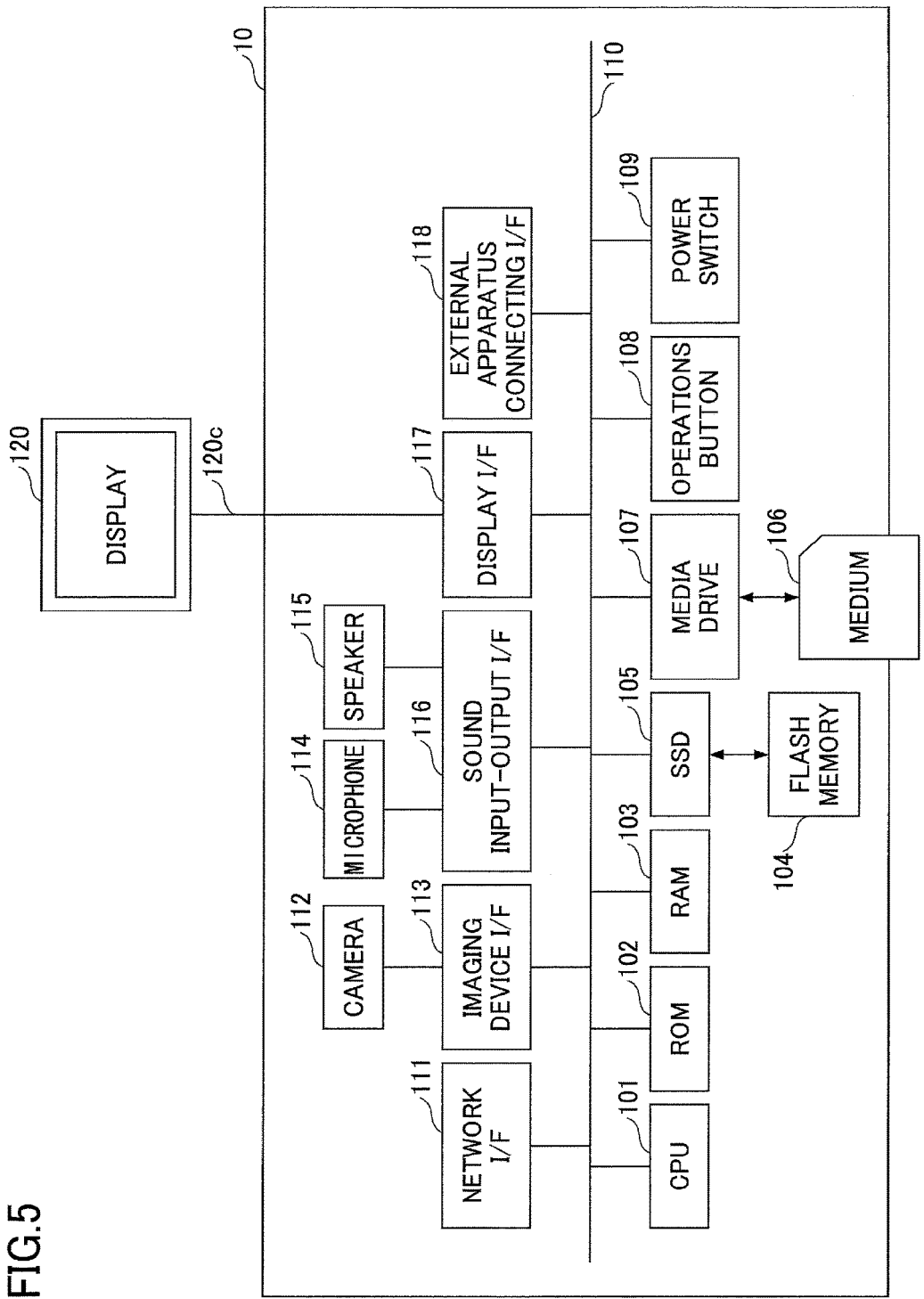
FIG. 5 is a hardware configuration diagram illustrating an example of a TV conference-specific terminal according to an embodiment.

Next, a description is given of a hardware configuration of the TV conference-specific terminal 10. FIG. 5 is a hardware configuration diagram illustrating a TV conference-specific terminal according to an embodiment. As illustrated in FIG. 5, the TV conference-specific terminal 10 includes a CPU (central processing unit) 101 configured to control operations of the entire TV conference-specific terminal 10, a ROM (read only memory) 102 storing programs for driving the CPU 101 such as initial program loader (IPL), a RAM (random access memory) 103 serving as a work area of the CPU 101, a flash memory 104 storing various types of data such as terminal programs, image data, and sound data, an SDD (solid state drive) 105 configured to control reading or writing of various types of data with respect to the flash memory 104 based on the control of the CPU 101, a media drive 107 configured to control reading or writing (storing) of data with respect to a recording medium 106 such as a flash memory, an operations button 108 to be operated when selecting a destination of the TV conference-specific terminal 10, a power switch 109 to switch ON/OFF of the power supply of the TV conference-specific terminal 10, and a network I/F (interface) 111 for transmitting data via the communications network 2.

The TV conference-specific terminal 10 further includes a built-in camera 112 configured to image a subject to acquire image data in accordance with the control of the CPU 101, an imaging device I/F 113 configured to control the drive of the camera 112, a built-in microphone 114 configured to input sound, a built-in speaker 115 configured to output sound, a sound input-output I/F 116 configured to process input and output of sound signals between the microphone 114 and the speaker 115 in accordance with the control of the CPU 101, a display I/F 117 configured to transmit image data to an externally attached display 120 in accordance with the control of the CPU 101, an external apparatus connecting I/F 118 for connecting various types of external apparatuses, and a bus line 110 such as an address bus or a data bus for electrically connecting the above-described components illustrated in FIG. 5.

The display 120 is a display part formed of liquid crystal or organic EL (OLED), and configured to display an image of the subject or operational icons. Further, the display 120 is connected to the display I/F 117 via a cable 120c. The cable 120c may be an analog RGB (VGA) signal-specific cable, a component video-specific cable, an high-definition multimedia interface (HDMI) (registered trademark) or a DVI (digital video interactive) signal-specific cable.

The camera 112 includes lenses or a solid-state image sensor configured to convert an image (video) of a subject into electronic data by converting light waves into electric charges. Examples of the solid-state image sensor include a CMOS (complementary metal oxide semiconductor) and a CCD (charge coupled device).

The external apparatus connecting I/F 118 is configured to be connected via a USB (universal serial bus) to external apparatuses such as an external camera, an external microphone, and an external speaker. When the external camera is connected to the external apparatus connecting I/F 118, the external camera is driven in preference to the built-in camera 112 in accordance with the control of the CPU 101. Similarly, when the external microphone or the external speaker is connected to the external apparatus connecting I/F 118, the external microphone or the external speaker connected to the external apparatus connecting I/F 118 is driven in preference to a corresponding one of the built-in microphone 114 and the built-in speaker 115 in accordance with the control of the CPU 101. Note that the TV conference-specific terminal 10 is not necessarily provided with the built-in camera 112, and may be connected to the external camera alone via the external apparatus connecting I/F 118. Similarly, the TV conference-specific terminal 10 is not necessarily provided with the built-in microphone 114 or the built-in speaker 115, and may be connected to the external microphone or the external speaker alone via the external apparatus connecting I/F 118. Moreover, the display 120 of the TV conference-specific terminal 10 is connected to the display I/F 117 via the cable 120c, but is not necessarily connected to the display I/F 117. The display 120 may be incorporated in the TV conference-specific terminal 10.

Further, the TV conference-specific terminal 10 may be provided with an external recording medium I/F configured to read an external recording medium such as an SD card or SIM (subscriber identity module) card in addition to the external apparatus connecting I/F 118.

Note that the recording medium 106 is configured to be removable from the TV conference-specific terminal 10. Further, when the recording medium 106 is a nonvolatile memory configured to read or write data in accordance with the control of the CPU 101, such a nonvolatile memory is not limited to the flash memory 104. The nonvolatile memory to be used may be an EEPROM (Electrically Erasable and Programmable ROM), or the like.

Further, the above-described terminal-specific programs may be distributed in a form of a computer-readable recording medium, such as the recording medium 106, and the like storing the programs in files of an installable format or an executable format. Alternatively, the above-described terminal-specific programs may be stored in the ROM 102 instead of the flash memory 104.

Mobile Terminal

Figure 6:
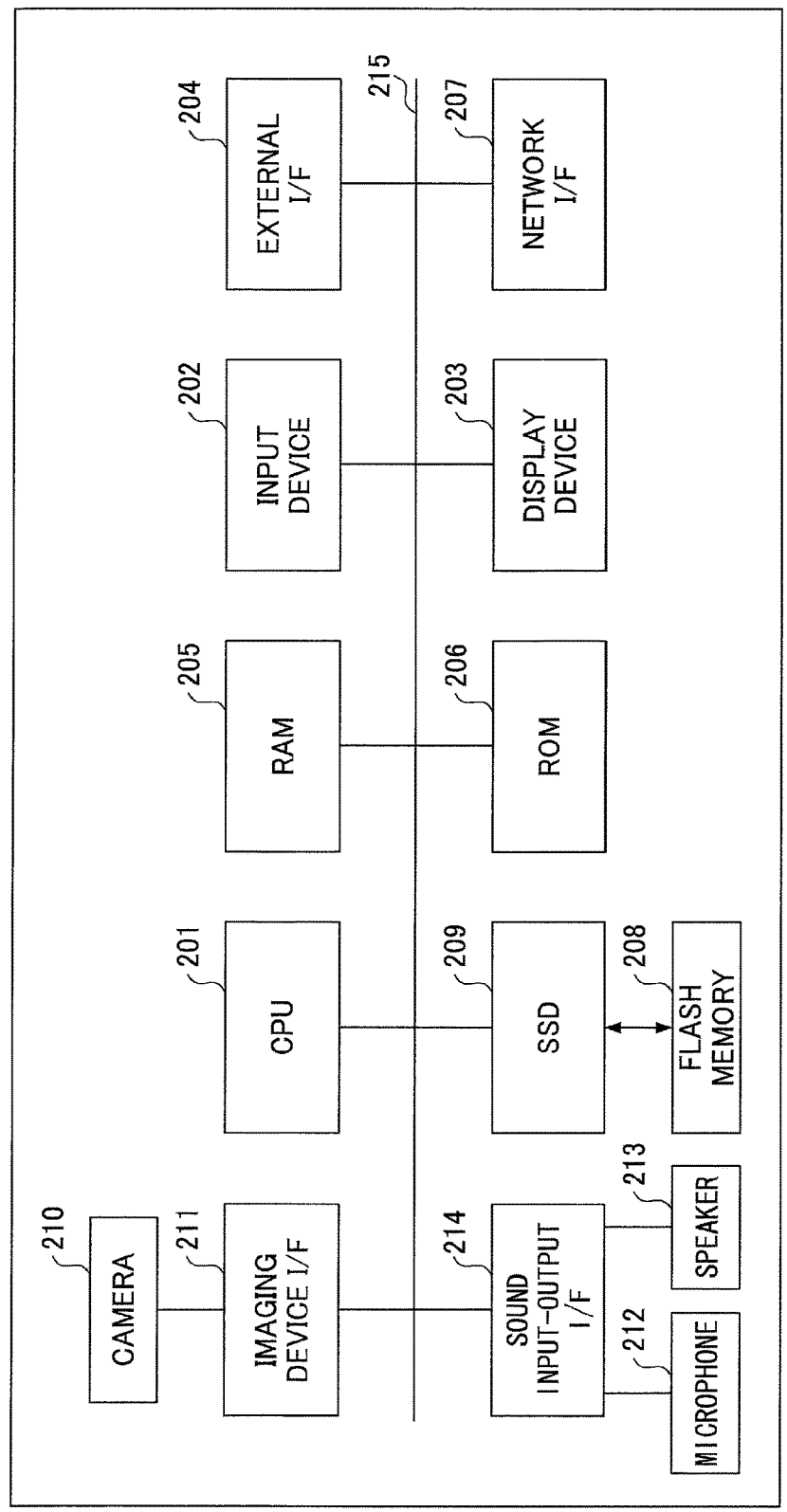
FIG. 6 is a hardware configuration diagram illustrating an example of a mobile terminal according to an embodiment.

FIG. 6 is a hardware configuration diagram illustrating an example of the mobile terminal according to an embodiment. As illustrated in FIG. 6, the mobile terminal 20 according to the embodiment includes a CPU 201 configured to control overall operations of the mobile terminal 20, an input device 202 configured to input various types of signals into the mobile terminal 20, a display device 203 configured to display a process result obtained by the mobile terminal 20, an external I/F 204 serving as an interface between various types of external apparatuses such as an external microphone, an external camera, and an external recording medium, and the mobile terminal 20, a RAM 205 utilized as a work area of the CPU 201, a ROM 206 configured to store programs and data such as settings of the OS of the mobile terminal 20 and network settings, a network I/F 207 configured to transmit data by utilizing a mobile phone communications network, a flash memory 208 configured to store various types of data such as terminal-specific programs, and an SSD 209 configured to control reading or writing of various types of data with respect to the flash memory 208 in accordance with the control of the CPU 201.

Further, the mobile terminal 20 includes a built-in camera 210 configured to image a subject to acquire image data in accordance of the control of the CPU 201, an imaging device I/F 211 configured to control driving of the camera 210, a built-in microphone 212 configured to input sound, a built-in speaker 213 configured to output sound, a sound input-output I/F 214 configured to input/output of sound signals between the microphone 212 and the speaker 213 in accordance with the control of the CPU 201, and a bus line such as an address bus or a data bus configured to electrically connect the above-described components as illustrated in FIG. 6. Note that when the mobile terminal 20 utilizes a text chat service alone, the mobile terminal 20 is not necessarily provided with the camera 210, the microphone 212, the speaker 213, and the like.

Further, when the recording medium 106 is a nonvolatile memory configured to read or write data in accordance with the control of the CPU 101, the recording medium 106 is not limited to the flash memory 208. The recording medium 106 may be an EEPROM (electrically erasable and programmable ROM).

The above-described terminal-specific programs may be distributed in a form of a computer-readable recording medium, such as the recording medium, and the like storing the programs in files of an installable format or an executable format. Alternatively, the above-described terminal-specific programs may be stored in the ROM 206 instead of the flash memory 208.

Figure 7:
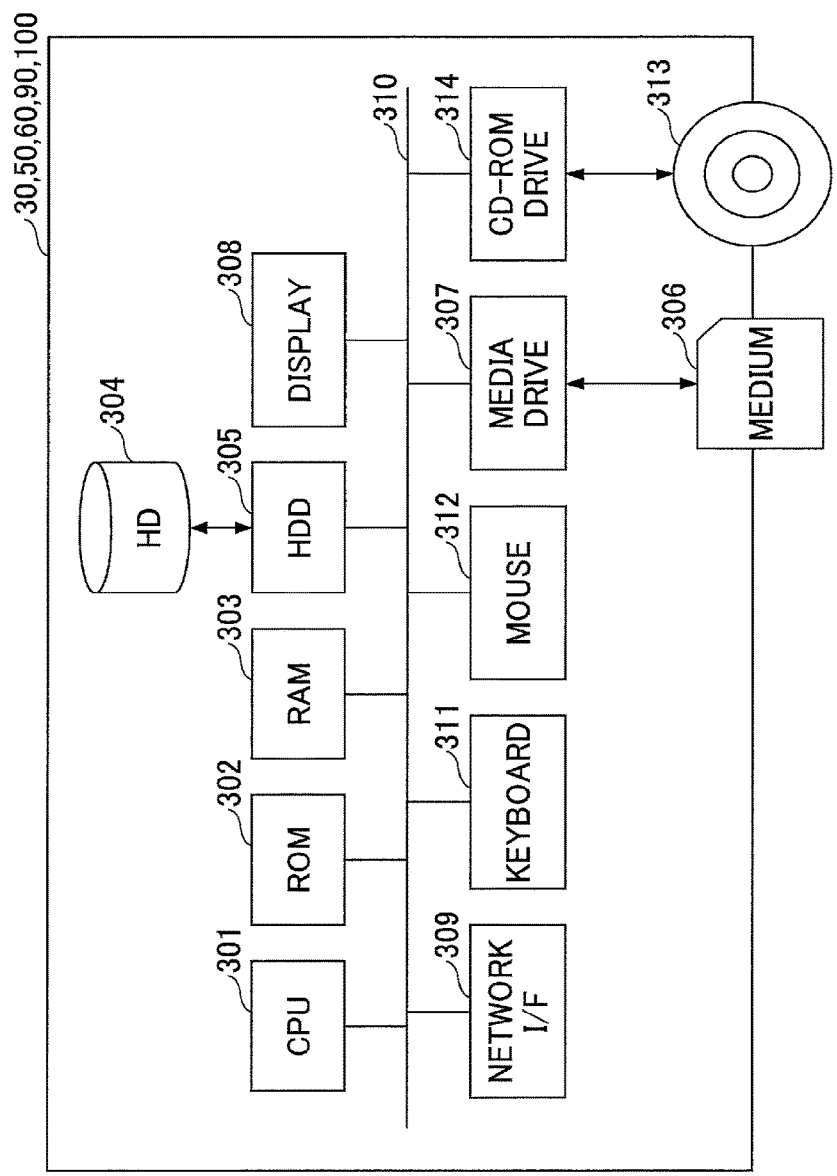
FIG. 7 illustrates a hardware configuration diagram illustrating examples of a relay apparatus, a transmission management system, a common information management apparatus, a program providing system, and a maintenance system according to an embodiment.

Relay Apparatus, Transmission Management System, Common Information Management Apparatus, Program Providing System, and Maintenance System Next, a description is given of hardware configurations of the relay apparatus 30, the transmission management system 50, the common information management apparatus 60, the program providing system 90, and the maintenance system 100. FIG. 7 is a hardware configuration diagram of the relay apparatus 30, the transmission management system 50, the common information management apparatus 60, the program providing system 90, and the maintenance system 100 according to an embodiment.

The transmission management system 50 includes a CPU 301 configured to control overall operations of the transmission management system 50, a ROM 302 configured to store a program for use in driving the CPU 301 such as an IPL (Initial Program Loader), a RAM 303 configured to serve as a work area of the CPU 301, an HD 304 configured to store data tailored for programs of the transmission management system 50, an HDD (hard disk drive) 305 configured to control reading or writing of the data with respect to the HD 304 in accordance of the control of the CPU 301, a media drive 307 configured to control reading or writing (storing) of data with respect to a recording medium 306 such as flash memory or the like, a display 308 configured to display various types of information such as a cursor, menus, windows, characters, or images, a network I/F 309 configured to perform data communications using the communications network 2, a keyboard 311 provided with multiple keys for inputting characters, numeric values, various types of instructions, and the like, a mouse 312 configured to select or execute various types of instructions, select a process target, and move a cursor, a CD-ROM drive 314 configured to control reading or writing of data with respect to a CD-ROM (compact disc read only memory) as an example of a removable recording medium, and a bus line 310 such as an address bus or a data bus for electrically connecting the above-described components as illustrated in FIG. 7.

Note that the above-described transmission management-specific programs may be distributed in a form of the above-described computer-readable recording medium 306, the CD-ROM 313, and the like storing the programs in files of an installable format or executable format. Alternatively, the above-described transmission management-specific programs may be stored in the ROM 302 instead of the HD 304.

Further, each of the relay apparatus 30 and the common information management apparatus 60 has a hardware configuration similar to that of the transmission management system 50, and hence, a duplicated illustration of the relay apparatus 30 and the common information management apparatus 60 is omitted from the specification. However, the HD 304 of the relay apparatus 30 stores relay apparatus-specific programs for controlling the relay apparatus 30, and the HD 304 of the common information management apparatus 60 stores information management-specific programs for controlling the common information management apparatus 60. In this case, the relay apparatus-specific programs and the information management-specific programs may be distributed in a form of the above-described computer-readable recording medium 306, CD-ROM 313, and the like storing the programs in files of an installable format or executable format. Alternatively, the above-described relay apparatus-specific programs and the information management-specific programs may be stored in the ROM 302 instead of the HD 304.

Further, each of the program providing system 90 and the maintenance system 100 has a hardware configuration similar to that of the transmission management system 50, and hence, a duplicated illustration of the program providing system 90 and the maintenance system 100 is omitted from the specification. Note that the HD 304 of the program providing system 90 stores program providing-specific programs for controlling the program providing system 90. In this case, the program providing-specific programs may also be distributed in a form of the above-described computer-readable recording medium 306, the CD-ROM 313 and the like storing the programs in files of an installable format or executable format. Alternatively, the above-described program providing-specific programs may be stored in the ROM 302 instead of the HD 304.

Note that other examples of the removable computer-readable recording medium include a CD-R (compact disc recordable), a DVD (digital versatile disk), a Blu-ray Disc, and the like.

Functional Configuration

Figure 8:
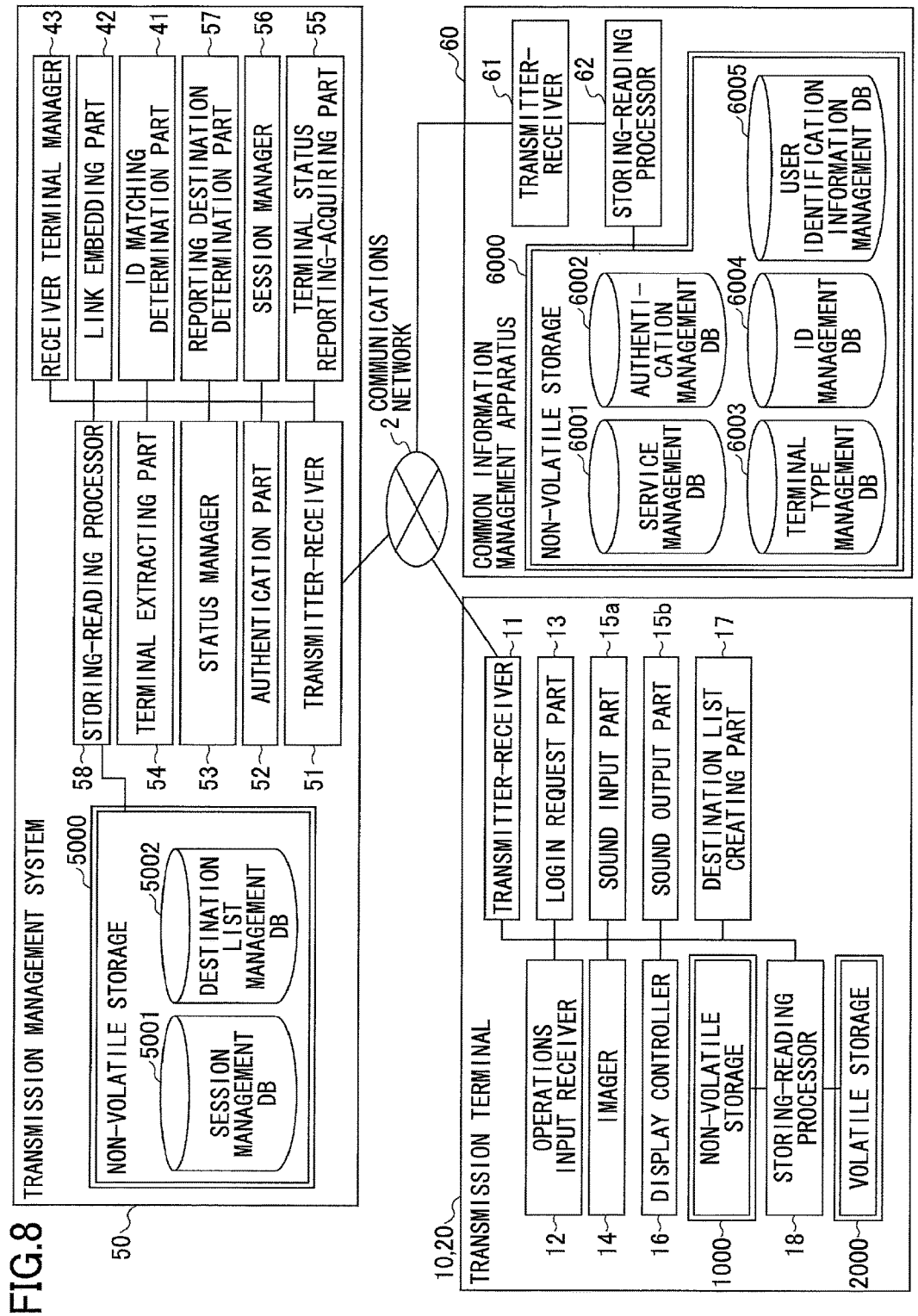
FIG. 8 is a functional block diagram illustrating examples of the transmission terminal, the common information management apparatus, and the transmission management system constituting the transmission system 1 according to an embodiment.

Next, a description is given of functional configurations of the embodiment. FIG. 8 is a functional block diagram illustrating each of the terminals, the apparatus, and the system constituting the transmission system according to the embodiment. In FIG. 8, the TV conference-specific terminal 10, the mobile terminal 20, the transmission management system 50, and the common information management apparatus 60 are connected via the communications network 2 to perform data communications with one another. Note that the relay apparatus 30, the program providing system 90, and the maintenance system 100 illustrated in FIG. 4 are omitted from FIG. 8 since these components are not directly associated with the embodiment.

Functional Configuration of Terminal

The TV conference-specific terminal 10 includes a transmitter-receiver 11, an operation input receiver 12, a login request part 13, an imager 14, a sound input part 15$a$, a sound output part 15$b$, a display controller 16, a destination list creating part 17, and a storing-reading processor 18. In the following, a description is mainly given of a case in which the TV conference-specific terminal 10 serves as the transmission terminal illustrated in FIG. 8.

The above-described components are functional components or functional parts implemented by causing any one of the components illustrated in FIG. 8 to operate based on instructions from the CPU 201 in accordance with the terminal-specific programs loaded from the flash memory 104 in the RAM 103.

Further, the TV conference-specific terminal 10 includes a volatile storage 2000 formed of the RAM 103 illustrated in FIG. 5, and a nonvolatile storage 1000 formed of a flash memory 104 illustrated in FIG. 5.

Next, a detailed description is given of a functional configuration of the TV conference-specific terminal 10 with reference to FIGS. 5 and 8. Note that in the following, an illustration is also given of a relationship with main components of the TV conference-specific terminal 10 for implementing the respective functional components of the TV conference-specific terminal 10, among the components illustrated in FIG. 8.

The transmitter-receiver 11 of the transmission terminal (TV conference-specific terminal) 10 illustrated in FIG. 8 is implemented by instructions from the CPU 101 illustrated in FIG. 5, and the network I/F 111 illustrated in FIG. 5, and configured to perform transmission and reception of various types of data (or information) with respect to other terminals, apparatuses, or systems via the communications network 2. The transmitter-receiver 11 starts receiving status information indicating a status of each of the transmission terminals serving as destination candidates from the TV conference management system 50$_1$ before starting communications with a desired destination terminal. Note that the status information not only includes operating statuses (online or offline) of the TV conference-specific terminals 10 and/or the mobile terminals 20, but also includes whether the user of each terminal is currently speaking or currently away from the user's seat even when the operating status is online. Further, the status information also includes various statuses such as the cable 120$c$ is disconnected from the TV conference-specific terminal 10, and sound and image statuses such as failing to display images while outputting sound, or a mute status indicating the setting disabling sound output in addition to the operating statuses of the TV conference-specific terminals 10. In the following, an illustration is given of an example when the status information indicates the operating status. Note that in the above example, when the transmission terminal in FIG. 8 is the mobile terminal 20, transmitter-receiver 11 starts receiving the status information indicating the status of each of the terminals serving as the destination candidates from the text chat management system $50_2$ before starting the communications with a desired destination terminal.

The operations input receiver 12 of the transmission terminal 10 illustrated in FIG. 8 is implemented by instructions from the CPU 101 illustrated in FIG. 5, and the operations button 108 and the power switch 109 illustrated in FIG. 5, and configured to receive various types of inputs from users. For example, when the user switches the power switch 109 illustrated in FIG. 5 ON, the operations input receiver 12 illustrated in FIG. 8 receives a power ON instruction to switch the power ON. Note that when the transmission terminal in FIG. 8 is the mobile terminal 20, the operations input receiver 12 is implemented by instructions from the CPU 201, and an input device 202.

The login request part 13 of the transmission terminal 10 illustrated in FIG. 8 is implemented by the CPU 101 illustrated in FIG. 5, and is configured to automatically transmit login request information representing an indication to request a login, terminal type information, services accessible to the request source terminal, a current IP address of the request source terminal from the transmitter-receiver 11 to the TV conference management system $50_1$ via the communications network 2, which is triggered by the reception of the power ON instruction. Further, when the user switches the power switch 109 from a power ON status to a power OFF status, the operations input receiver 12 completely switches the power OFF after the transmitter-receiver 11 transmits status information indicating that the power will be switched OFF to the TV conference management system $50_1$. Hence, the TV conference management system $50_1$ may be able to detect change of the power status of the TV conference-specific terminal 10 from the power ON status to the power OFF status.

Note that in the above example, when the transmission terminal in FIG. 8 is the mobile terminal 20, the login request part 13 is implemented by instructions from the CPU 201, and is configured to transmit login request information representing an indication to request a login, terminal type information of the request source terminal, services accessible to the request source terminal, a current IP address of the request source terminal from the transmitter-receiver 11 to the text chat management system $50_2$ via the communications network 2, which is triggered by the reception of the login operation performed by the user of the mobile terminal 20. As described above, in the mobile terminal 20, the login request and the like are transmitted to the text chat management system $50_2$ by the user's login operation on the programs (terminal-specific programs) installed in the mobile terminal 20.

The imager 14 of the transmission terminal 10 illustrated in FIG. 8 is implemented by instructions from the CPU 101 illustrated in FIG. 5, the camera 112 and the imaging device I/F 113 illustrated in FIG. 5, and is configured to image a subject to output image data acquired by imaging the subject. Note that when the transmission terminal in FIG. 8 is the mobile terminal 20, the imager 14 is implemented by instructions from the CPU 201 illustrated in FIG. 6, the camera 210 and the imaging device I/F 211 illustrated in FIG. 6. However, when the mobile terminal 20 uses the text chat service alone, the mobile terminal 20 does not necessarily have the imager 14.

The sound input part 15a of the transmission terminal 10 illustrated in FIG. 8 is implemented by instructions from the CPU 101 illustrated in FIG. 5, and the sound input-output I/F 116 illustrated in FIG. 5, and is configured to convert sound of the user's voice input by the microphone 114 into sound signals and then input sound data associated with the sound signals. The sound output part 15b of the transmission terminal 10 illustrated in FIG. 8 is implemented by the instructions from the CPU 101 illustrated in FIG. 5, and the sound input-output I/F 116 illustrated in FIG. 5, and is configured to output the sound signals associated with the sound data to the speaker 115 to cause the speaker 115 to output sounds. Note that when the transmission terminal in FIG. 8 is the mobile terminal 20, the sound input part 15a and the sound output part 15b are implemented by instructions from the CPU 201 illustrated in FIG. 6, the sound input-output I/F 214 illustrated in FIG. 6. However, when the mobile terminal 20 uses the text chat service alone, the mobile terminal 20 does not necessarily have the sound input part 15a and the sound output part 15b.

The display controller 16 of the transmission terminal 10 illustrated in FIG. 8 is implemented by the instructions from the CPU 101 illustrated in FIG. 5, and the display I/F 117 illustrated in FIG. 5, and is configured to control transmission of image data with respect to an externally attached display 120. Note that when the transmission terminal in FIG. 8 is the mobile terminal 20, the display controller 16 illustrated in FIG. 6 is implemented by instructions from the CPU 201 illustrated in FIG. 6, and the display device illustrated in FIG. 6, and is configured to control transmission of image data or the like with respect to the display device 203.

The destination list creating part 17 of the transmission terminal 10 illustrated in FIG. 8 is implemented by instructions from the CPU 101 illustrated in FIG. 5, and is configured to create or update destination lists based on destination list information and status information of the TV conference-specific terminals 10 and/or the mobile terminals 20 serving as the destination candidates received from the transmission management system 50. Note that when the transmission terminal in FIG. 8 is the mobile terminal 20, the destination list creating part 17 is implemented by the CPU 201 illustrated in FIG. 6.

The storing-reading processor 18 of the transmission terminal 10 illustrated in FIG. 8 is implemented by instructions from the CPU 101 illustrated in FIG. 5, executed by the SDD 105 illustrated in FIG. 5, and is configured to store various types of data in the nonvolatile storage 1000 and read various types of data from the nonvolatile storage 1000. The nonvolatile storage 1000 is configured to store a communications ID (identification) and a password corresponding to the communications ID for identifying a TV conference-specific terminal 10 or a user as a communications destination. Note that it is not necessary to store the communications ID and the corresponding password in the nonvolatile storage 1000. In such a case, the communications ID and the corresponding password may be input by the user every time the user transmits a login request to the transmission management system 50.

The storing-reading processor 18 is further configured to store various types of data in the volatile storage 2000, and read various types of data from the volatile storage 2000. The volatile storage 2000 overwrites and stores image data or sound data received by performing communications with the destination terminal, and overwrites the stored image data or sound data every time the volatile storage 2000 receives the image data or sound data. Among these data, images based on the image data before being overwritten are displayed on the display 120, and sounds based on the sound data before being overwritten are output from the speaker 150. Note that in the above example, when the transmission terminal in FIG. 8 is the mobile terminal 20, the storing-reading processor 18 is implemented by instructions from the CPU 201 illustrated in FIG. 6, and the SSD 209 illustrated in FIG. 6. Further, the volatile storage 2000 also stores the text data received by performing a text chat with the destination terminal.

Functional Configuration of Transmission Management System

The transmission management system 50 includes a transmitter-receiver 51, an authentication part 52, a status manager 53, a terminal extracting part 54, a terminal status reporting-acquiring part 55, a session manager 56, a reporting destination determination part 57, an ID matching determination part 41, a link embedding part 42, a receiver terminal manager 43, and a storing-reading processor 58. The above-described components are functional components or functional parts implemented by causing any one of the components illustrated in FIG. 8 to operate instructions from the CPU 301 in accordance with the authentication management server programs loaded from the HD 304 in the RAM 303 illustrated in FIG. 7. Further, the transmission management server 50 includes a nonvolatile storage 5000 configured to maintain various types of data (or information) stored even though the power of the transmission management server 50 is switched OFF. The nonvolatile storage 5000 is formed of the HD 304 illustrated in FIG. 7.

Session Management Table

Further, the nonvolatile storage 5000 includes a session management DB 5001 composed of a session management table illustrated in FIG. 9. In the session management table, the relay apparatus ID of the relay apparatus 30 used for relaying data, the communications ID of the request source terminal, and the communications ID of the destination terminal are managed in association with each of the session IDs. For example, the in the session management table illustrated in FIG. 9, the relay apparatus 30a (the relay apparatus ID "111a") selected based on the session ID "se1" relays data between the request source terminal (the mobile terminal 02aa) having the communications ID "02aa" and the destination terminal (the TV conference-specific terminal 10ab) having the communications ID "01ab".

Destination List Management Table

Further, the nonvolatile storage 5000 includes a destination list management DB 5002 composed of destination list management tables illustrated in FIGS. 10A and 10B. The destination list management table is an example of destination terminal registration information.

FIG. 10A is an example of the destination list management table registering destination information managed by the TV conference management system $50_1$. FIG. 10B is an example of the destination list management table registering destination information managed by the text chat management system $50_2$. These destination list management tables are configured to manage all the communications IDs of the destination terminals registered as destination terminal candidates in association with the communications ID of the request source terminal that has requested starting (calling) of the connection in the TV conference service or the text chat service. Further, the communications IDs of the destination terminals are provided with information about the respective management systems 50 managing call control of the destination terminals after the "@" mark of the communications IDs. For example, the destination list management table managed by the TV conference management system $50_1$ illustrated in FIG. 10A indicates that destination terminal candidates capable of transmitting a connection start request for using the TV conference service from the request source terminal (the TV conference-specific terminal 10ab) having the communications ID "01ab" include the TV conference-specific terminal 10ab having the communications ID "01aa" managed by the TV conference management system $50_1$, and the mobile terminal 20aa having the user ID "02AA" managed by the text chat management system $50_2$.

On the other hand, the destination list management table managed by the text chat management system $50_2$ illustrated in FIG. 10B indicates that destination terminal candidates capable of transmitting a connection start request for using the TV conference service or the text chat service from the request source terminal (the mobile terminal 20aa) having the user ID "02AA" include the mobile terminal 20ab having the user ID "02AB" managed by the text chat management system $50_2$, and the TV conference-specific terminal 10ab having the communications ID "01ab" managed by the TV conference management system $50_1$. Note that the even though the destination terminals are managed in the destination lists, the connection start request is unable to be transmit for the services unavailable to the destination terminals. For example, the mobile terminal 20aa having the user ID "02AA" is unable to transmit a connection start request for using the text chat service (but is able to transmit a connection start request for using the TV conference service) to the destination terminal having the communications ID "01ab".

Note that the description after the "@" mark illustrated in FIGS. 10A and 10B may be domain information (domain names) corresponding to the transmission management systems 50.

Next, an illustration is given of respective functional components of the transmission management system 50. Note that in the following, an illustration is also given of a relationship with main components illustrated in FIG. 8 for implementing the functional components of the transmission management system 50.

The transmitter-receiver 51 of the transmission management system 50 illustrated in FIG. 8 is implemented by instructions from the CPU 301 illustrated in FIG. 7, executed by the network I/F 309 illustrated in FIG. 7, and is configured to perform transmission and reception of various types of data (or information) with respect to other terminals, apparatuses, or servers via the communications network 2.

The authentication part 52 of the transmission management system 50 illustrated in FIG. 8 is implemented by instructions from the CPU 301 illustrated in FIG. 7, executed by the network I/F 309 illustrated in FIG. 7, and is configured to search the authentication management DB 6002 of the common information management apparatus 60 for the communications ID and the password included in the login request information received via the transmitter-receiver 51, and perform authentication by determining whether the communications ID and the password identical to those included in the login request information are managed in the authentication management DB 6002.

The status manager 53 of the transmission management system 50 illustrated in FIG. 8 is implemented by instructions from the CPU 301 illustrated in FIG. 7, and is configured to store an operating status of the request source terminal that has transmitted the login request in association with the communications ID and the like of the request source terminal in the ID management DB 6004 of the common information management apparatus 60 to manage the operating status of the request source terminal.

The terminal extracting part 54 of the transmission management system 50 illustrated in FIG. 8 is implemented by instructions from the CPU 301 illustrated in FIG. 7, is configured to search the destination list management DB 5002 for the communications ID of the request source terminal that has transmitted the login request as a key, and read the communications IDs of the destination terminal candidates capable of being connected to the request source terminal, and information about the transmission management system 50 that manages calling control of the transmission terminals having the read communications IDs.

The terminal status reporting-acquiring part 55 of the transmission management system 50 illustrated in FIG. 8 is implemented by instructions from the CPU 301 illustrated in FIG. 7, and is configured to acquire the operation statuses of the transmission terminals managed by the transmission management system 50 itself. Further, the terminal status reporting-acquiring part 55 is configured to report the received operating status of the request source terminal to the terminals serving as the destination candidates.

The session manager 56 of the transmission management system 50 illustrated in FIG. 8 is implemented by instructions from the CPU 301 illustrated in FIG. 7, and is configured to store in the session management DB 5001 of the nonvolatile storage 5000 the relay apparatus ID of the relay apparatus 30 that relay content data in association with the session ID, the communications ID of the request source terminal, and the communications ID of the destination terminal.

The reporting destination determination part 57 of the transmission management system 50 illustrated in FIG. 8 is implemented by instructions from the CPU 301 illustrated in FIG. 7, and is configured to determine the transmission management system 50 to which the operating status of the request source terminal is reported based on the service name included in the login request from the request source terminal. For example, when the mobile terminal 20 allowed to use the TV conference service has logged into the text chat management system 50$_2$, the reporting destination determination part 57 determines that the operating status of the mobile terminal 20 is reported to the TV conference management system 50$_1$. Hence, it may be possible to report or acquire status information such as the operating statuses of the transmission terminals that are allowed to use different services managed by different call control.

The ID matching determination part 41 of the transmission management system 50 illustrated in FIG. 8 is implemented by instructions from the CPU 301 illustrated in FIG. 7, is configured to acquire the communications ID in association with the user ID from the user identification information management DB 6005, and determine whether the acquired communications ID matches the number included in the text message.

The link embedding part 42 of the transmission management system 50 illustrated in FIG. 8 is implemented by instructions from the CPU 301 illustrated in FIG. 7, and is configured to embed, in the communications ID included in the text message, a link for starting the TV conference, a link for the user to register the communications ID in the destination list management table, or a link for the user to log into the TV conference management system 50$_1$.

The receiver terminal manager 43 of the transmission management system 50 illustrated in FIG. 8 is implemented by instructions from the CPU 301 illustrated in FIG. 7, is configured to manage registration statuses of the communications IDs in the destination list management table, and login statuses of the mobile terminals 20 in the TV conference management system 50$_1$.

The storing-reading processor 58 is implemented by instructions from the CPU 301 illustrated in FIG. 7, executed by the HDD 305 illustrated in FIG. 7, and is configured to store various types of data in the nonvolatile storage 5000, and read various types of data from the nonvolatile storage 5000.

Functional Configuration of Common Information Management Apparatus

The common information management apparatus 60 includes a transmitter-receiver 61, and a storing-reading processor 62. The above-described components are functional components or functional parts implemented by causing any one of the components illustrated in FIG. 7 to operate instructions from the CPU 301 in accordance with the management system programs loaded from the HD 304 in the RAM 303. Further, the common information management apparatus 60 includes a nonvolatile storage 6000 configured to maintain various types of data (or information) stored even though the power of the common information management apparatus 60 is switched OFF. The nonvolatile storage 6000 is formed of the HD 304 illustrated in FIG. 7.

Service Management Table

The nonvolatile storage 6000 includes a service management DB 6001 composed of a service management table illustrated in FIG. 11. In the service management table, each of names of the transmission management systems that perform call control of the respective services are managed in association with a corresponding one of the service names of the transmission system 1. For example, in the service management table illustrated in FIG. 11, the service name "TV conference" indicating call control is managed by the transmission management system having a name "TV conference management system" (the transmission management system 50$_1$). Similarly, the service name "text chat" indicating call control is managed by the transmission management system having a name "text chat management system" (the transmission management system 50$_2$).

Note that the management system names illustrated in FIG. 11 may be domain information (domain names) corresponding to the transmission management systems 50.

Authentication Management Table

Further, the nonvolatile storage 6000 includes an authentication management DB 6002 composed of an authentication management tables illustrated in FIGS. 12A and 12B. In the authentication management table in FIG. 12A, each of the communications IDs of all the transmission terminals (TV conference-specific terminals 10 and the mobile terminals 20) managed by the TV conference management system 501 is managed in association with a corresponding one of the passwords. For example, in the terminal authentication management table illustrated in FIG. 12A, the communications ID of the TV conference-specific terminal 10aa is "01aa", and the corresponding password is "aaaa".

Similarly, in the authentication management table in FIG. 12B, each of the user IDs of all the transmission terminals (TV conference-specific terminals 10 and the mobile terminals 20) managed by the TV conference management system 50$_2$ is managed in association with a corresponding one of the passwords.

Terminal Type Management Table

Further, the nonvolatile storage 6000 includes a terminal type management DB 6003 composed of a terminal type management table illustrated in FIG. 13. In the terminal type management table, each of the terminal type names of all the transmission terminals forming the transmission system 1 is managed in association with a corresponding one of the service names available to the terminals of these types. For example, in the terminal type table illustrated in FIG. 13, the terminals having the terminal type name "TV conference-specific" may be able to use the service having the service name "TV conference". Similarly, the terminals having the terminal type name "general-purpose" may be able to use the service having the service name "TV conference" and the service having the service name "text chat". Further, the terminals having the terminal type name "chat-specific" may be able to use the service having the service name "text chat".

Note that in this embodiment, the terminal type name of the TV conference-specific terminals 10 is "TV conference-specific", and the terminal type name of the mobile terminals 20 is "general-purpose". Note that the mobile terminals 20 having installed the program for utilizing the text chat service alone may serve as the terminals having the terminal type name "chat-specific". Similarly, the mobile terminals 20 having installed the program for utilizing the TV conference service alone may serve as the terminals having the terminal type name "TV conference-specific". Thus, the mobile terminals 20 may be able to serve as the terminals of different terminal types in accordance with the different types of terminal-specific programs installed.

ID Management Table

The nonvolatile storage 6000 further includes a ID management DB 6004 composed of an ID management table illustrated in FIG. 14. In the ID management table, a name of the terminal when the communications ID of the terminal is specified as a destination, an operating status of the terminal, a reporting destination of the operating status, received date and time at which the login information is received by the transmission management system 50, and an IP address of the terminal are managed in association with each of the communications IDs of the terminals forming the transmission system 1. For example, in the ID management table illustrated in FIG. 14, the TV conference-specific terminal 10aa having the communications ID "01aa" has a name "AA conference terminal", the operating status "online (communicative)", the reporting destination "-" the received date and time "2013.11.10.13:40" at which the login request information is received by the transmission management system 50 (the TV conference management system 50₁), and the IP address "1.2.1.3". Note that when the reporting destination has "-" (no setting), the operating status of the terminal is not transmitted to another transmission management system 50. That is, the operating status of the terminal is transmitted to the transmission management system 50 only when the terminal has transmitted the login request. In the above example, the operating status of the TV conference-specific terminal 10aa is reported only to the transmission management system 50₁ (TV conference management system).

Meanwhile, the mobile terminal 20aa having the communications ID "02AA" has a name "AA mobile terminal", the operating status "online (communicative)", the reporting destination "TV conference management system", the received date and time "2013.11.25.14:30" at which the login request information is received by the transmission management system 50 (the text chat management system 50₂), and the IP address "1.4.1.1". Note that when the reporting destination is set, the operating status of the terminal is reported to the other transmission management system 50 set as the reporting destination. In the above example, the operating status of the mobile terminal 20aa is reported only to the transmission management system 50₁ (TV conference management system). Note that multiple reporting destinations such as "TV conference management system, XXX management system, etc." may be set as the reporting destination.

User Identification Information Management Table

Further, the nonvolatile storage 6000 includes a user identification information management DB 6005 composed of a user identification information management table illustrated in FIG. 15. In the user identification information management table, the user IDs of the user identification information in the text chat service and the communications IDs for identifying users in the TV conference service are managed in association with the respective management IDs. The user identification information management table is an example of registered information.

The user IDs and the communications IDs are basically associated with one another on the one-to-one basis; however, one user ID may be associated with multiple communications IDs. In the user identification information management table, it is possible to read the communications ID in association with the user ID of the user who has input the text message via the text chat service. Hence, the ID matching determination part 41 may be able to determine whether communications ID included in the text message matches the communications ID assigned to the user serving as a sender of the text message.

Note that the communications ID in this example is represented by a two digit number plus lower-case alphabetic characters such as "01aa"; however, the actual number may have more digits. For example, the communications ID may be composed of 10 or more digit number and alphabetic characters, as illustrated in FIGS. 1 and 2. This embodiment basically illustrates the communications ID with two digit number with lower-case alphabetic characters, and optionally uses 12 digit number as desired. For example, the communications ID of the mobile terminal 20aa may be "123456789012".

Next, an illustration is given of functional configurations of the common information management apparatus 60. Note that in the following, an illustration is also given of a relationship with main components for implementing the functional configurations of the common information management apparatus 60, among the components illustrated in FIG. 8.

The transmitter-receiver 61 of the common information management apparatus 60 illustrated in FIG. 8 is implemented by instructions from the CPU 301 illustrated in FIG. 7, and executed by the network I/F 309 illustrated in FIG. 7, and is configured to perform transmission and reception of various types of data (or information) with respect to the transmission management systems 50 via the communications network 2.

The storing-reading processor 62 is implemented by instructions from the CPU 301 illustrated in FIG. 7, and executed by the HDD 305 illustrated in FIG. 7, and is configured to store various types of data in the nonvolatile storage 6000, and read various types of data from the nonvolatile storage 6000.

Details of Process

Login, Display of Destination List, Establishment of Session

Figure 16:
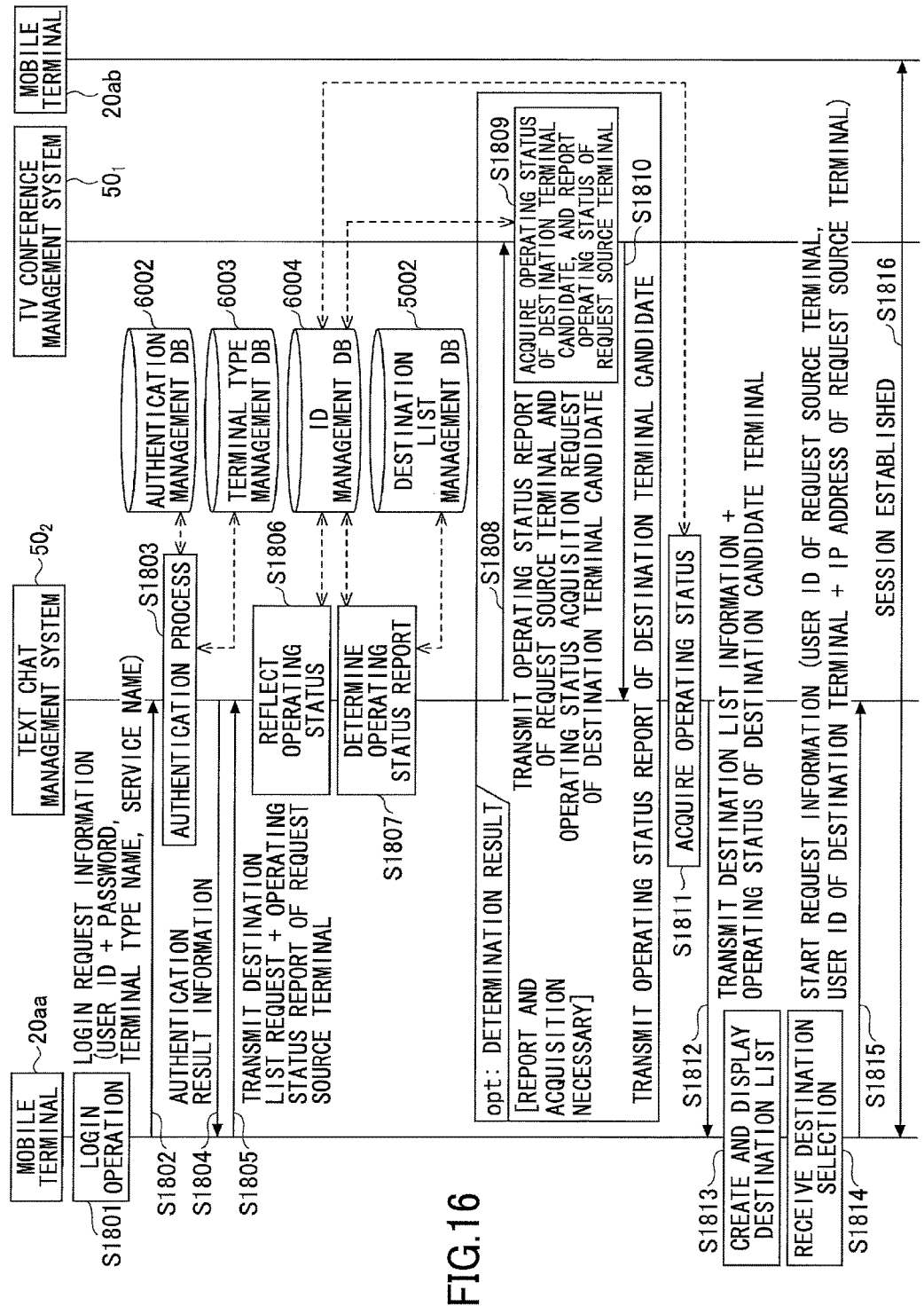
FIG. 16 is a sequence diagram illustrating an example of a process from a TV conference-specific terminal login step to a destination list display step according to an embodiment.

In the following, a description is given, with reference to FIG. 16, of a detailed process of displaying a destination list which is a list of destination terminal candidates for the mobile terminal 20aa by a user operating the mobile terminal 20aa. FIG. 16 is a sequence diagram illustrating an example of a process from a mobile terminal login step to a destination list display step according to an embodiment.

The user performs a login operation via the mobile terminal 20 via the input device 202 (step S1801).

The operations input receiver 12 of the mobile terminal 20 receives the login operation and transmits login request information to the text chat management system 50₂ (step S1802). This login request information includes a user ID and a password for identifying the mobile terminal 20*aa* of the user's own terminal serving as a request source terminal. Further, the login request information includes a terminal type name, and service names of the mobile terminal 20*aa*. Note that the user ID and the password are input from the user via the operations input receiver 12 when the user performs a login operation. Note that when the login request information is transmitted from the mobile terminal 20*aa* to the text chat management system 50₂, the text chat management system 50₂ serving as the receiver may be able to detect the IP address of the mobile terminal 20*aa* serving as a transmitter.

In the following description, it is assumed that the terminal type name and the service names included in the login request information transmitted by the mobile terminal 20*aa* are "general-purpose" and "TV conference and text chat", respectively.

Subsequently, when the authentication part 52 of the text chat management system 50₂ receives the login request information via the transmitter-receiver 51, the authentication part 52 performs an authentication process (step S1803). The authentication process indicates a process of determining whether the user ID and password transmitted from the mobile terminal 20*aa* are registered in the authentication management table. In the following description, it is assumed that the authentication is established.

The transmitter-receiver 51 of the text chat management 50₂ transmits an authentication result generated in the authentication process of the step S1803 to the mobile terminal 20*aa* (step S1804). In the following description, it is assumed that the text chat management system 50₂ has transmitted the authentication result indicating a successful login to the mobile terminal 20*aa*. Note that when the mobile terminal 20*aa* receives the authentication information indicating login failure from the text chat management system 50₂, the mobile terminal 20*aa* displays a screen indicating the login failure on the display device 203 of the mobile terminal 20*aa* and ends the process.

Subsequently, when the transmitter-receiver 11 of the mobile terminal 20*aa* receives the authentication result indicating the successful login from the text chat management system 50₂, the mobile terminal 20*aa* transmits a destination list request and a report of an operating status of the mobile terminal 20*aa* (step S1805). Note that the operating status of the mobile terminal 20*aa* is information indicating the operating status being "online (communicative)". However, in a state where the mobile terminal 20*aa* the operating status of which is online fails to perform communications with other transmission terminals for some reasons, such information may indicate "online (communication disabled)" or the like.

Subsequently, the status manager 53 of the text chat management system 50₂ changes the operating status of the request source terminal (the mobile terminal 20*aa*) in the ID management DB 6004 of the common information management apparatus 60 into "online (communicative)" (step S1806).

Figure 17:
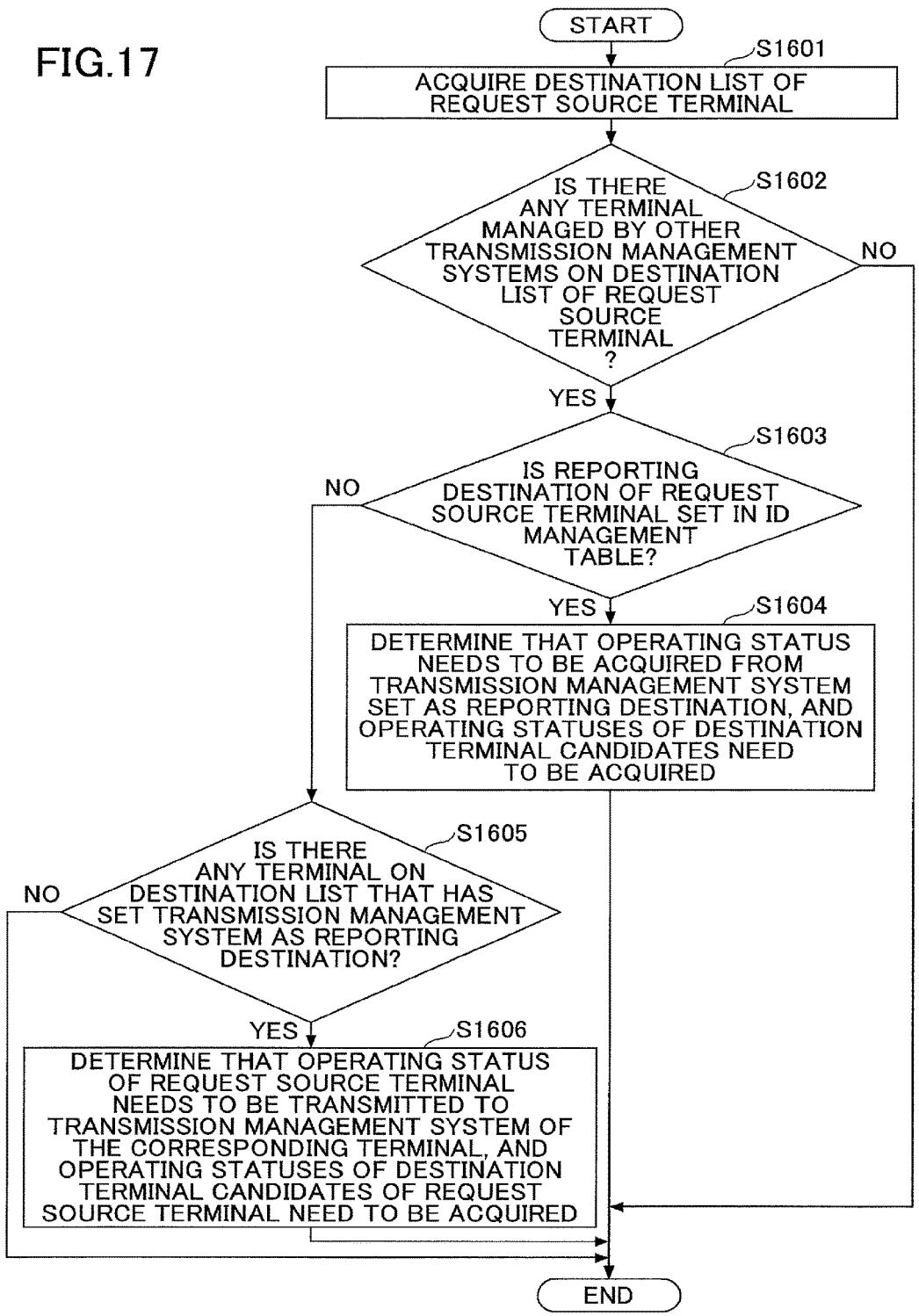
FIG. 17 is a flowchart illustrating an example of an operating status report determination process according to an embodiment.

Then, the text chat management system 50₂ performs a process of determining the operating status report (an operating status report determination process) (step S1807). The operating status report determination process will be described with reference to FIG. 17. FIG. 17 is a flowchart illustrating an example of the operating status report determination process according to an embodiment.

The terminal extracting part 54 of the text chat management system 50₂ acquires a destination list of the request source terminal (the mobile terminal 20*aa*) from the destination list management table of the destination list management DB 5002 (step S1601).

Next, the reporting destination determination part 57 of the text chat management system 50₂ determines whether there are any transmission terminals managed by other transmission systems 50 in the destination list acquired in step S1601 (step S1602).

In this example, the destination list of the mobile terminal 20*aa* (the user ID "02AA") includes "02AB@text chat management system" and "01*ab*@TV conference management system". Hence, since there is a TV conference-specific terminal 10*ab* having the communications ID "01*ab*" managed by the TV conference management system 50₁, step S1603 is processed.

Note that in a case where there is no transmission terminal managed by another transmission management system 50, the process of FIG. 17 ends. That is, in this case, all the destination terminal candidates included in the acquired destination list are the transmission terminals managed by the text chat management system 50₂. Hence, the reporting destination determination part 57 of the text chat management system 50₂ determines that it is not necessary to transmit a report of the operating status of the request source terminal, or acquire the operation statuses from another transmission management system 50.

Subsequently, the reporting destination determination part 57 of the text chat management system 50₂ determines whether the reporting destination with respect to the request source terminal (the mobile terminal 20*aa*) is set in the ID management table (step S1603).

In this example, since the "TV conference management system" is set as the reporting destination of the mobile terminal (the communications ID "02*aa*") in the ID management table, step S1604 is processed.

Subsequently, the reporting destination determination part 57 of the text chat management system 50₂ determines that the operating status of the request source terminal needs to be transmitted to another transmission management system 50 (the TV conference management system 50₁) set as the reporting destination of the request source terminal in the ID management table, and also that the operating statuses of the destination terminal candidates need to be acquired, and then ends the process (step S1604). As described above, when the reporting destination of the request source terminal is set in the ID management table, the reporting destination determination part 57 determines that the operating status of the request source terminal needs to be transmitted to the reporting destination, and that the operating statuses of the destination terminal candidates of the request source terminal need to be acquired.

When the determination in step S1603 is "NO", step S1605 is processed. The reporting destination determination part 57 of the text chat management system 50₂ determines whether there are destination terminal candidates on the destination list of the request source terminal that have set the text chat management system 50₂ itself as the reporting destination in the ID management table (step S1605).

Subsequently, the reporting destination determination part 57 of the text chat management system 50₂ determines that the operating status of the request source terminal needs to be reported to the transmission management system 50 that manages the destination terminal candidates setting the text chat management system $50_2$ as the reporting destination, and that the operating statuses of the destination terminal candidates of the request source terminal need to be acquired (step S1606).

Subsequently, the following description is given by referring back to FIG. 16. In the operating status report determination process in step S1807 illustrated with reference to FIG. 17, when it is determined that the operating status needs to be reported and acquired with respect to another transmission management system 50, steps S1808 to S1810 are processed. In this example, since it is determined that the operating status needs to be reported and acquired with respect to the TV conference management system $50_1$ as described above, steps S1808 to S1810 are processed.

Initially, the transmitter-receiver 51 of the text chat management system $50_2$ transmits an acquisition request of the operating status "online (communicative)" of the request source terminal (the mobile terminal 20aa), and an acquisition request of the operating status of the corresponding destination terminal candidate (the TV conference-specific terminal 10ab) to the TV conference management system $50_1$ (step S1808).

Subsequently, when the terminal status reporting-acquiring part 55 of the TV conference management system $50_1$ receives the operating status of the request source terminal and the acquisition request of the operating status of the corresponding destination terminal candidate, the terminal status reporting-acquiring part 55 acquires the operating status of the destination terminal candidate, and reports the operating status of the request source terminal to the destination terminal candidate (step S1809). Note that the operating status of the request source terminal is reported to the destination terminal candidate only when the operating status of the destination terminal candidate is "online".

In this case, the terminal status reporting-acquiring part 55 of the TV conference management system $50_1$ acquires the operating status of the TV conference-specific terminal 10ab (the communications ID "01ab") serving as the destination terminal candidate from the ID management DB 6004. Since the operating status of the TV conference-specific terminal 10ab is "offline", the operating status of the request source terminal (the mobile terminal 20aa) is not reported to the TV conference-specific terminal 10ab.

Subsequently, the transmitter-receiver 51 of the text chat management system $50_2$ reports the operating status of the destination terminal candidate (the TV conference-specific terminal 10ab) to the text chat management system $50_2$ (step S1810).

The terminal status reporting-acquiring part 55 of the text chat management system $50_2$ acquires the operating status of the transmission terminal managed by itself (the text chat management system $50_2$), among the destination terminal candidates of the request source terminal (the mobile terminal 20aa), from the ID management DB 6004 (step S1811). In this case, the terminal status reporting-acquiring part 55 of the text chat management system $50_2$ acquires the operating status of the transmission terminal serving as the mobile terminal 20ab (the user ID "02AB") managed by itself (the text chat management system $50_2$), among the destination terminal candidates of the mobile terminal 20aa, from the ID management DB 6004.

Then, the transmitter-receiver 51 of the text chat management system $50_2$ transmits the destination list information (the communications ID of the destination terminal candidate, etc.), and the operating statuses of the destination terminal candidates acquired in steps S1810 and 1811 to the request source terminal (the mobile terminal 20aa) (step S1812). In this example, the transmitter-receiver 51 transmits the destination list information of the mobile terminal 20aa serving as the request source terminal, and the operating statuses of the mobile terminal 20ab and the TV conference-specific terminal 10ab serving as the destination terminal candidates included in the destination list to the mobile terminal 20aa.

When the destination list creating part 17 of the mobile terminal 20aa receives the destination list information and the operating statuses of the destination terminal candidates from the text chat management system $50_2$, the destination list creating part 17 creates a destination list and displays the destination list on the display device 203 (step S1813). Note that the destination list illustrated in FIG. 18 may be displayed on the display device 203 of the mobile terminal 20aa.

Figure 18:
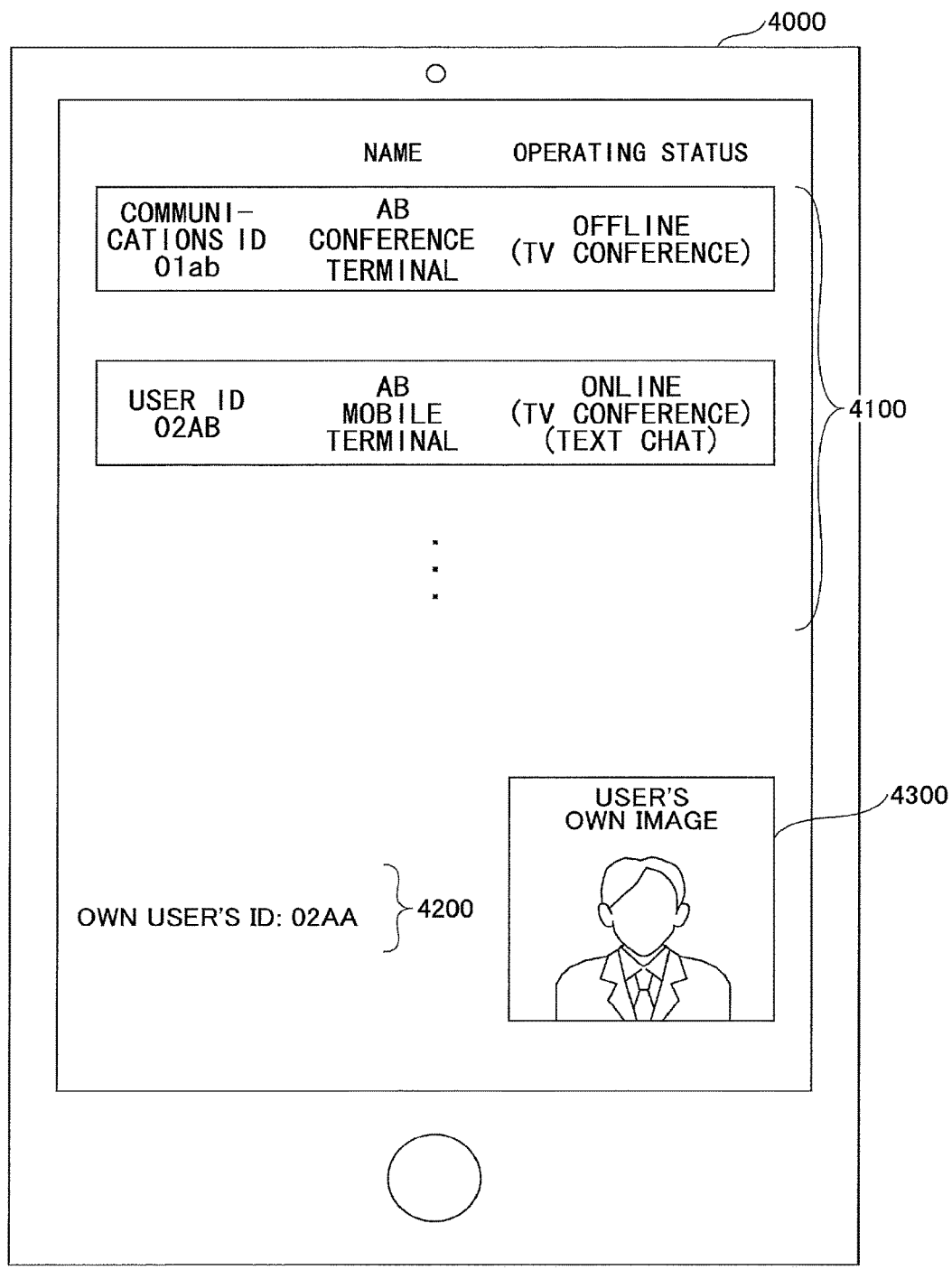
FIG. 18 is an image diagram illustrating an example of the destination list display screen displayed on the TV conference-specific terminal.

FIG. 18 is an image diagram illustrating an example of the destination list display screen displayed on the mobile terminal. The destination list display screen 4000 illustrated in FIG. 18 includes a destination list 4100, the communications ID 4200 of the own terminal, and an image display 4300 imaged by the own terminal. The destination list 4100 displays a list of the transmission terminals serving as the destination terminal candidates of the mobile terminal 20aa. The list of the destination terminal candidates displays the communications IDs, the user IDs, names, the operating statuses of the destination terminal candidates, and the services (TV conference, text chat) available to the destination terminal candidates.

The communications ID 4200 indicates the user ID of the mobile terminal 20aa that displays the destination list display screen 4000. The image display 4300 displays an image imaged by the camera 210 of the mobile terminal 20aa that displays the destination list display screen 4000.

The user of the mobile terminal 20aa may be able to select a desired one of the transmission terminals that the user wishes to perform communications with from the destination list 4100 of the destination list display screen 4000 so as to perform the TV conference or the text chat with the selected transmission terminal. Note that among the destination terminal candidates displayed on the destination list 4100, the transmission terminal having the operating status being "offline" or the transmission terminal that is engaged in the communications with another transmission terminal even when the operating status is "online", the user of the mobile terminal 20aa may fail to perform the TV conference with such a transmission terminal.

Referring back to FIG. 16, the user of the mobile terminal 20aa selects a desired one of the transmission terminals the user wishes to perform the communications with from the destination list of the destination list display screen (step S1814).

Subsequently, the transmitter-receiver 11 of the mobile terminal 20aa transmits start request information indicating a desire to start communications including the user ID "02AA" of the request source terminal 20aa and the user ID "02AB" of the destination terminal 20ab to the text chat management system $50_2$ (step S1815). When the start request information is transmitted to the text chat management system $50_2$, the text chat management system $50_2$ acquires the IP address of the request source terminal. The start request information is an example of a communications connecting request.

Accordingly, the text chat management system $50_2$ reads the IP address of the mobile terminal 20ab serving as the destination terminal by referring to the ID management table, and establishes a text chat session between the mobile terminal 20aa and the mobile terminal 20ab (step S1816).

In the session established by the TV conference management system 50₁, the relay apparatus 30 establishes a session when requested by the TV conference management system 50₁. However, in the text chat service, the text chat management system 50₂ establishes a session. Note that the relay apparatus 30 may establish a session in the text chat service.

Further, a process in which the mobile terminal 20aa logs into the text chat management system 50₂ is described in FIG. 16. However, a process in which the TV conference-specific terminal 10 logs into the TV conference management system 50₁ is similar to the process described in FIG. 16.

First Embodiment

The first embodiment describes a transmission system 1 in which the text chat management system 50₂ verifies a communications ID included in a text message. In the following, the mobile terminal 20aa transmits the text message, the mobile terminal 20ab receives the transmitted text message. In the following description, the mobile terminal 20aa may also be referred to as a transmission source, and the mobile terminal 20ab may also be referred to as a transmission partner.

Transmission of Communications ID in Text Chat Management System

Figure 19:
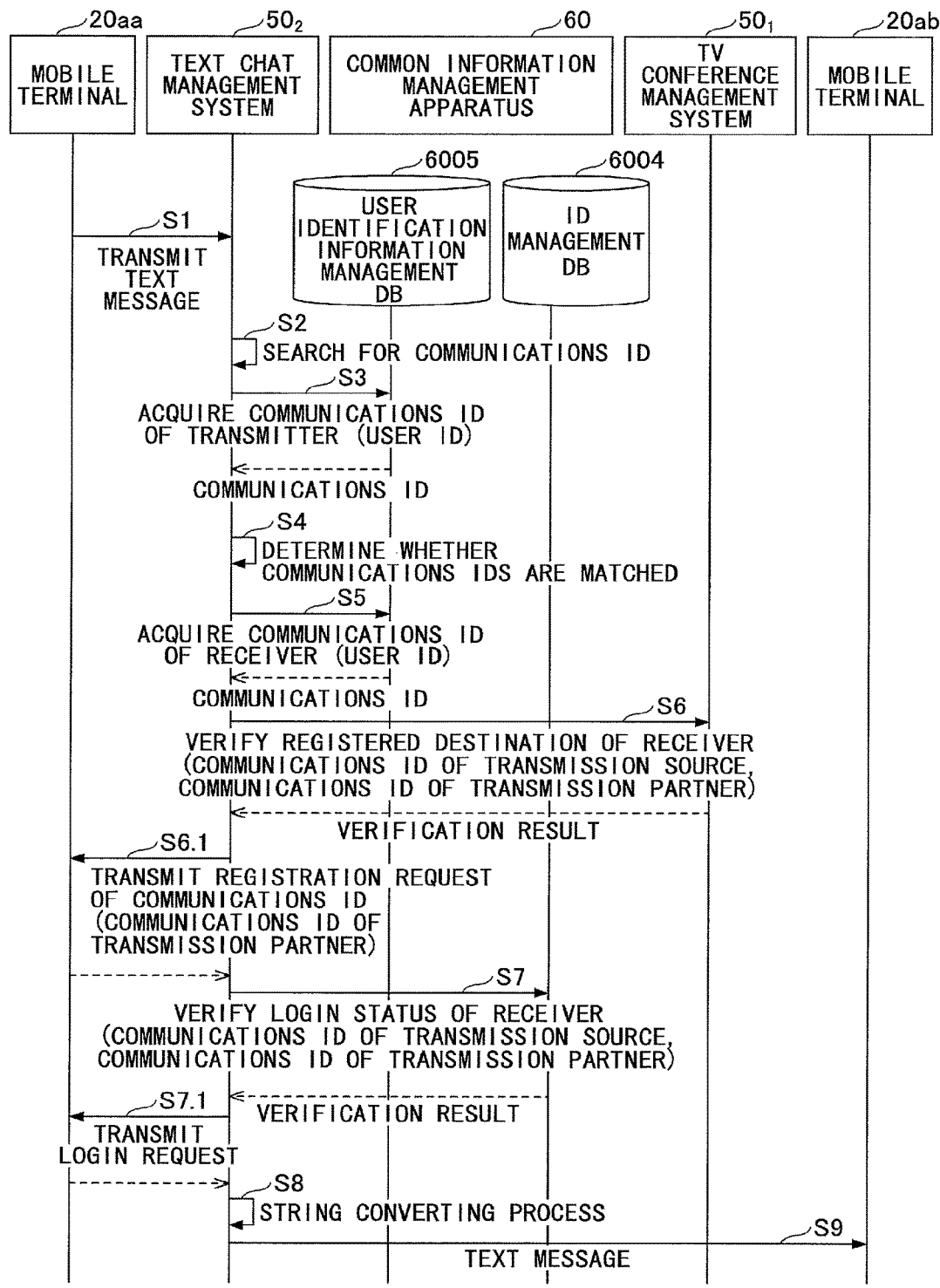
FIG. 19 is a sequence diagram illustrating an example of a process in which a mobile terminal transmits its own communications ID.
Figure 20:
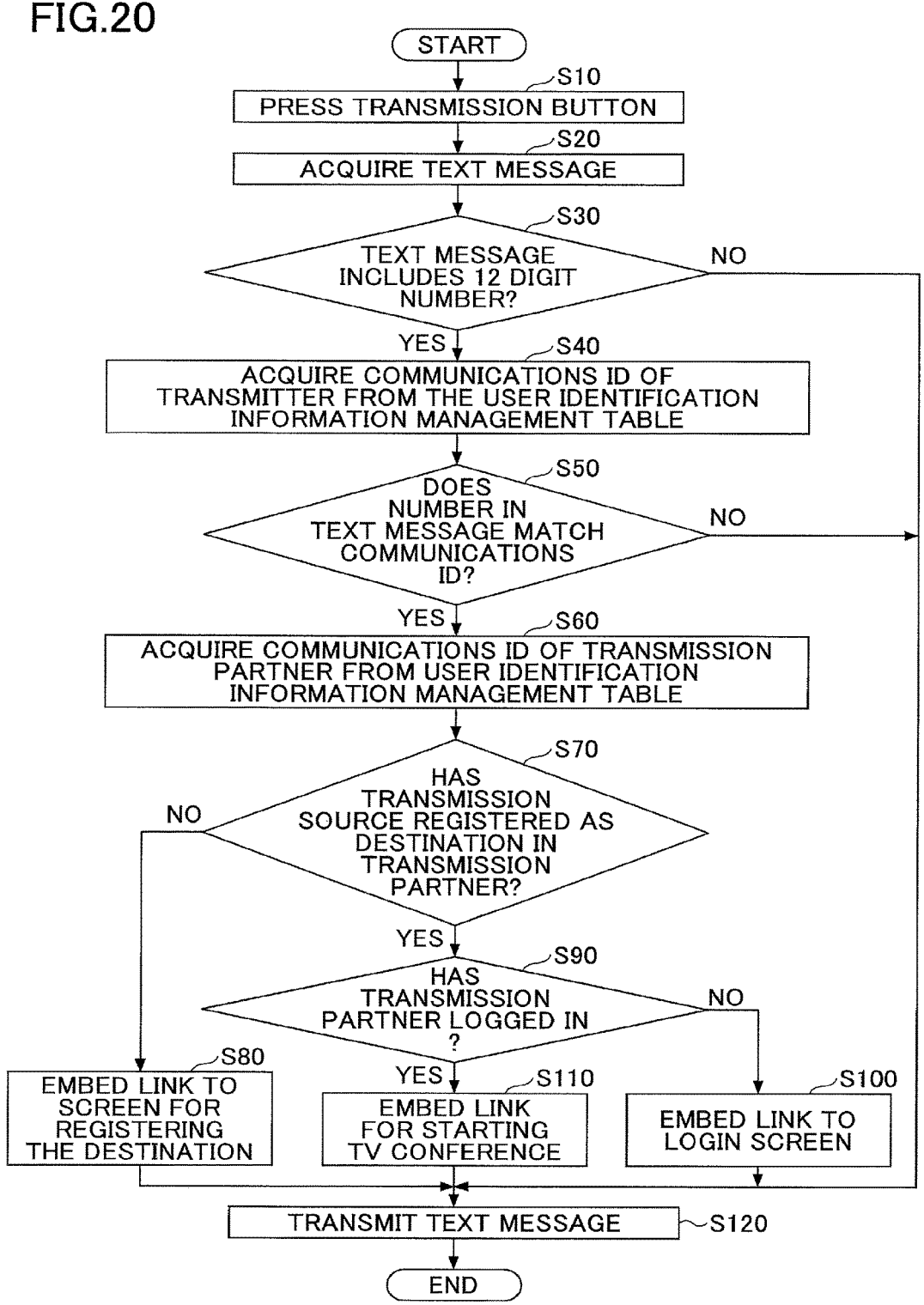

An illustration is given of a process in which the user transmits the user's own communications ID after the mobile terminal 20aa starts the text chat with the mobile terminal 20ab. FIG. 19 is an example of a sequence diagram illustrating a process in which the mobile terminal 20aa transmits its own communications ID, FIG. 20 is a flowchart illustrating a process in which the text chat management system 50₂ verifies the communications ID or the like.

In step S1, the transmitter-receiver 11 of the mobile terminal 20aa transmits a text message to the text chat management system 50₂. In step S2, when the transmitter-receiver 51 of the text chat management system 50₂ receives the text message, the ID matching determination part 41 determines whether the text message includes the communications ID (12 digit numeric number). In this example, it is assumed that the text message includes the communications ID. In step S3, the ID matching determination part 41 of the text chat management system 50₂ reads the communications ID in association with the user ID of the mobile terminal 20aa serving as a transmission source from the user identification information management table. The user ID of the mobile terminal 20aa serving as the transmission source to be used may be registered in a table such as the session management table, or may be attached to the text message transmitted by the mobile terminal 20aa. In step S4, the ID matching determination part 41 determines whether the communications ID included in the text message matches the communications ID read from the user identification information management table. In this example, it is assumed the above two communications IDs are matched. However, when the two communications IDs are not matched, steps subsequent to step S9 are not performed. In step S5, the receiver terminal manager 43 reads the communications ID in association with the user ID of the mobile terminal 20ab serving as a transmission partner from the user identification information management table. The user ID of the mobile terminal 20ab to be used may be registered in a table such as the session management table, or may be attached to the text message transmitted by the mobile terminal 20ab. In step S6, the receiver terminal manager 43 transmits the communications ID of the transmission source and the communications ID of the transmission partner to the TV conference management system 50₁, and requests the TV conference management system 50₁ to verify the communications ID registered in the destination list management table.

The verification is required because when the communications ID of the destination is not registered in the destination list management table, the mobile terminal 20 of the transmission source is unable to call or transmit a message the mobile terminal 20 of the transmission partner. In the destination list management table in FIG. 10A, since "02aa@TV conference management system" is registered in the destination list of the mobile terminal 20ab, and the communications ID of the mobile terminal 20aa is registered in the destination list of the mobile terminal 20ab.

Further, the receiver of the transmission (the mobile terminal 20aa in this case) needs to register the communications ID of the transmitter (the mobile terminal 20ab in this case) in the destination list management table. In the destination list management table in FIG. 10A, since "02ab@TV conference management system" is registered in the destination list of the mobile terminal 20aa, the communications ID of the mobile terminal 20ab is registered in the destination list of the mobile terminal 20aa. The above-described technique may interfere with unknown people to the user to request connecting to the user. In step S6.1, when the communications ID of the mobile terminal 20ab is not registered in the destination list of the mobile terminal 20aa, the receiver terminal manager 43 requests the mobile terminal 20aa to register the communications ID of the mobile terminal 20ab in the destination list management table. Note that it may be assumed that the mobile terminal 20aa allows the registration of the communications ID of the mobile terminal 20ab in the own destination list management table by transmitting a text message in step S1. Hence, before step S6.1, the text chat management system 50₂ may request the TV conference management system 50₁ to register the communications ID of the mobile terminal 20ab in the destination list management table of the mobile terminal 20aa. In step S7, the receiver terminal manager 43 acquires the operating statuses of the mobile terminal 20aa serving as the transmission source and the mobile terminal 20ab serving as the transmission partner with respect to the TV conference management system 50₁ from the ID management table. In step S7.1, when the operating status of the mobile terminal 20aa is offline, the receiver terminal manager 43 requests the mobile terminal 20aa to log into the TV conference management system 50₁. In step S8, the link embedding part 42 of the text chat management system 50₂ performs a conversion process on a string in the text message. That is, the link embedding part 42 embeds a link for starting the conference in the communications ID included in the text message. Details of the link are illustrated with reference to FIG. 20. In step S9, the transmitter-receiver 51 of the text chat management system 50₂ transmits the text message to the mobile terminal 20ab serving as the transmission partner.

Subsequently, an illustration is given with reference to FIG. 20.

The user of the mobile terminal 20aa serving as the transmission source inputs a text message to transmit the text message (step S10). As a result, the text message is transmitted to the text chat management system 50₂, and the transmitter-receiver 51 of the text chat management system 50₂ acquires the text message (step S20).

Subsequently, the ID matching determination part 41 determines whether the string of the acquired text message contains 12 digit number (step S30). The 12 digit number is employed in this example determined because the communications ID is composed of 12 digit number. The extraction of the text message that is most likely to include the communications ID may be facilitated by the determination made in step S30. When the communications ID is composed of a an eleven digit number, the ID matching determination part 41 determines whether the string of the acquired text message contains eleven digits. In addition, when a format description having a horizontal bar "-" at a certain position, whether "-" is included at a predetermined position in the same number of digits is determined. Thus, the ID matching determination part 41 may merely determine the format description of the communications ID and whether the same string is included.

When the determination in step S30 is NO, the transmitter-receiver 51 of the text chat management system 50$_2$ transmits the text message as it is to the mobile terminal 20*ab* serving as the transmission partner (step S120). That is, since the text message is most unlikely to include the communications ID, the text message is transmitted as it is.

When the determination in step S30 is YES, the ID matching determination part 41 of the text chat management system 50$_2$ acquires the communications ID in association with the user ID of the mobile terminal 20*aa* from the user identification information management table (step S40).

Subsequently, the ID matching determination part 41 determines whether the number assumed to be the communications ID included in the text message matches the communications ID acquired from the user identification information management table (step S50).

When the determination in step S50 is NO, the ID matching determination part 41 determines that the number assumed to be the communications ID in step S30 has no association with the user of the mobile terminal 20*aa* serving as the transmission source, and the transmitter-receiver 51 of the text chat management system 50$_2$ transmits the text message as it is to the mobile terminal 20*ab* of the transmission partner (step S120).

When the determination in step S50 is YES, the ID matching determination part 41 determines that the number assumed to be the communications ID is (matches) the communications ID of the user of the mobile terminal 20*aa*, and performs the following process to allow the mobile terminal 20*ab* serving as the transmission partner to start the TV conference.

Initially, the receiver terminal manager 43 of the text chat management system 50$_2$ determines whether the communications ID of the mobile terminal 20*aa* is registered in the destination list of the mobile terminal 20*ab* in the destination list management table (step S70). Note that the receiver terminal manager 43 also determines whether the communications ID of the mobile terminal 20*ab* is registered in the destination list of the mobile terminal 20*aa* in the destination list management table.

When the determination in step S70 is NO, the link embedding part 42 embeds a link of the destination registration in the communications ID of the mobile terminal 20*aa* (step S80). That is, the link embedding part 42 embeds a URI (uniform resource identifier) to acquire a web page for the destination registration in the communications ID of the mobile terminal 20*aa*. The user of the mobile terminal 20*ab* may acquire the web page from this URI to register the communications ID of the mobile terminal 20*aa* in the destination list of the mobile terminal 20*ab* in the destination list management table.

When the determination in step S70 is YES, the receiver terminal manager 43 of the text chat management system 50$_2$ determines whether the mobile terminal 20*ab* serving as the transmission partner has logged into the TV conference management system 50$_1$ (step S90). Since the TV conference management system 50$_1$ differs from the text chat management system 50$_2$, the TV conference is unable to start unless the user of the mobile terminal 20*ab* has logged into the TV conference management system 50$_1$. Note that the receiver terminal manager 43 also determines whether the mobile terminal 20*aa* serving as the transmission source has logged into the TV conference management system 50$_1$.

When the determination in step S90 is NO, the link embedding part 42 embeds a link in a login screen of the TV conference management system 50$_1$ in the communications ID of the mobile terminal 20*aa* (step S100) That is, the link embedding part 42 embeds a URI (uniform resource identifier) capable of acquiring a web page for the login screen in the communications ID of the mobile terminal 20*aa*.

When the determination in step S90 is YES, the link embedding part 42 embeds a link in a start screen for starting the TV conference in the communications ID of the mobile terminal 20*aa* (step S110). That is, the link embedding part 42 embeds a link for transmitting to the TV conference management system 50$_1$ the start request information including the communications IDs "02*ab*" and "02*aa*" of the mobile terminal 20*ab* as the request source terminal and the mobile terminal 20*aa* as the transmission partner in the communications ID of the mobile terminal 20*aa*.

After the above-described process, the transmitter-receiver 51 of the text chat management system 50$_2$ transmits a text message having a link of step S80, S100 or S110 embedded to the mobile terminal 20*ab*.

When the process illustrated in FIG. 20 ends, the user of the mobile terminal 20*ab* determines that the communications ID of the mobile terminal 20*aa* is correct when the link is embedded in the communications ID of the mobile terminal 20*ab* to start the TV conference, or optionally registers the communications ID of the mobile terminal 20*aa* in the destination list management table and logs into the TV conference management system 50$_1$ to start the TV conference. Further, even when multiple numbers similar to the communications ID are included in the text message, the communications ID may be easily identified.

When a link is not embedded in the communications ID, the user of the mobile terminal 20*ab* determines that the communications ID of the mobile terminal 20*aa* is not correct. Hence, the user of the mobile terminal 20*ab* may be able to take an appropriate action such as asking the user of the mobile terminal 20*aa* about the communications ID again without starting the TV conference.

Second Embodiment

A second embodiment illustrates a transmission system 1 in which the mobile terminal 20*aa* that transmits a text message including the communications ID verifies the communications ID included in the text message.

Figure 21:
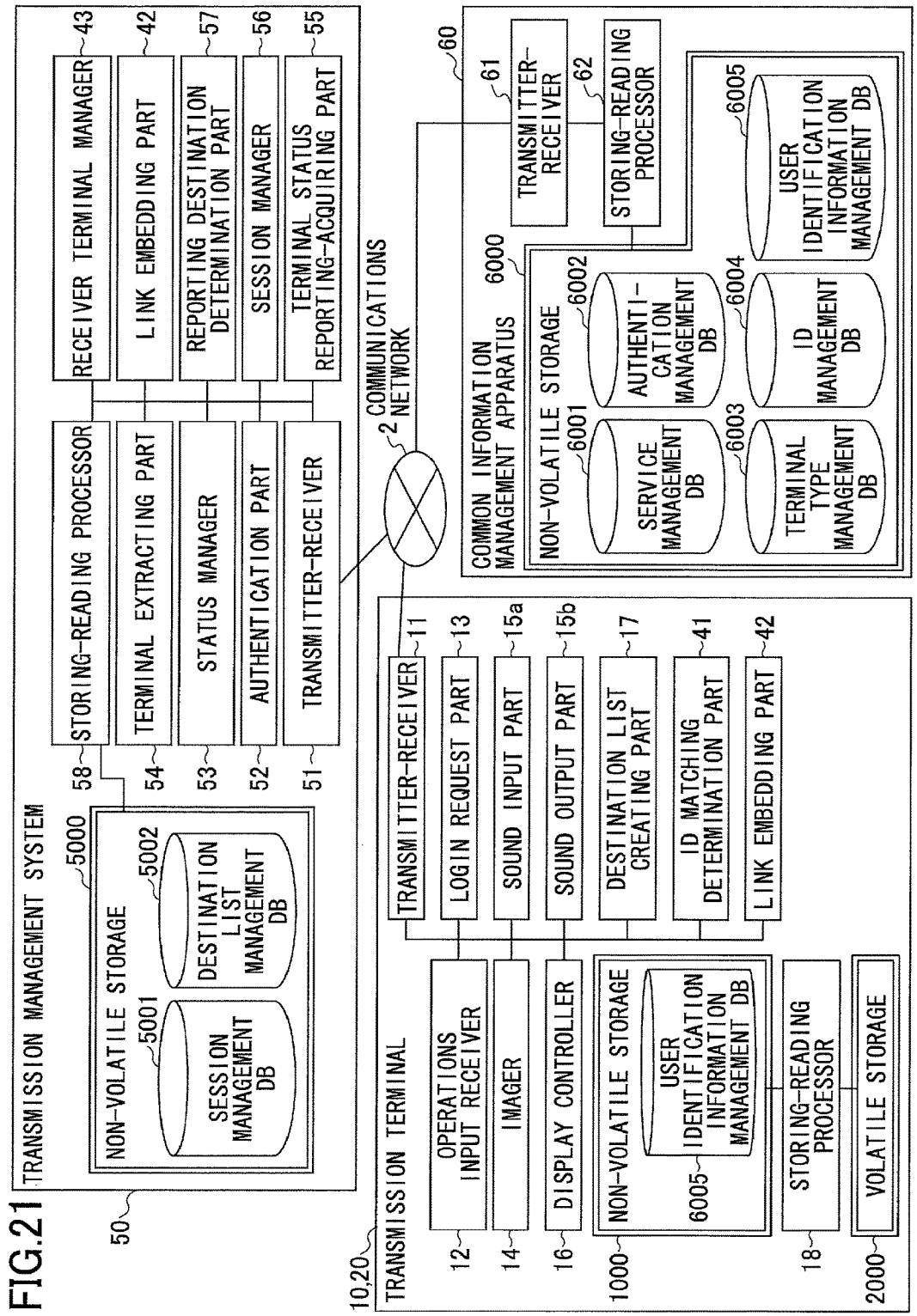
FIG. 21 is a functional block diagram illustrating examples of the transmission terminal, the common information management apparatus, and the transmission management system constituting the transmission system 1 according to an embodiment (second embodiment)

FIG. 21 is a functional block diagram illustrating each of the terminals, the apparatus, and the system constituting the transmission system according to the second embodiment. In the transmission system 1 according to the second embodiment, components that are provided with the same reference numbers of the transmission system 1 according to the first embodiment implement the same functional components. Hence, main components of the second embodiment may be described.

According to the configuration illustrated in FIG. 21, the mobile terminal 20 includes an ID matching determination part 41, and a link embedding part 42. The matching determination part 41 and the link embedding part 42 are implemented by instructions from the CPU illustrated in FIG. 6, and are configured to function in a manner similar to a case when the text chat management system $50_2$ includes these functional components.

Further, the mobile terminal 20 includes a volatile storage 2000 formed of the RAM 103 illustrated in FIG. 6, and a nonvolatile storage 1000 formed of a flash memory 104 illustrated in FIG. 6. The volatile storage 2000 includes the user identification information management DB 6005. The user identification information table held by the mobile terminal 20 has information similar to that held by the common information management apparatus 60 in the first embodiment. However, in the second embodiment, the user identification information table may include the communications ID in association with the user ID of the transmission source (the user of the transmission source) and the user ID of the transmission partner.

On the other hand, the text chat management system $50_2$ serving as the transmission management system 50 includes the ID matching determination part 41 and the link embedding part 42. This is because in the text chat management system $50_2$, whether the two communications IDs are matched is also determined in order to embed a link in the communications ID included in the text message. Note that the link embedding part 42 of the mobile terminal 20ab may alternatively be omitted, and all the link embedment may be performed by the text chat management system $50_2$.

Figure 22:
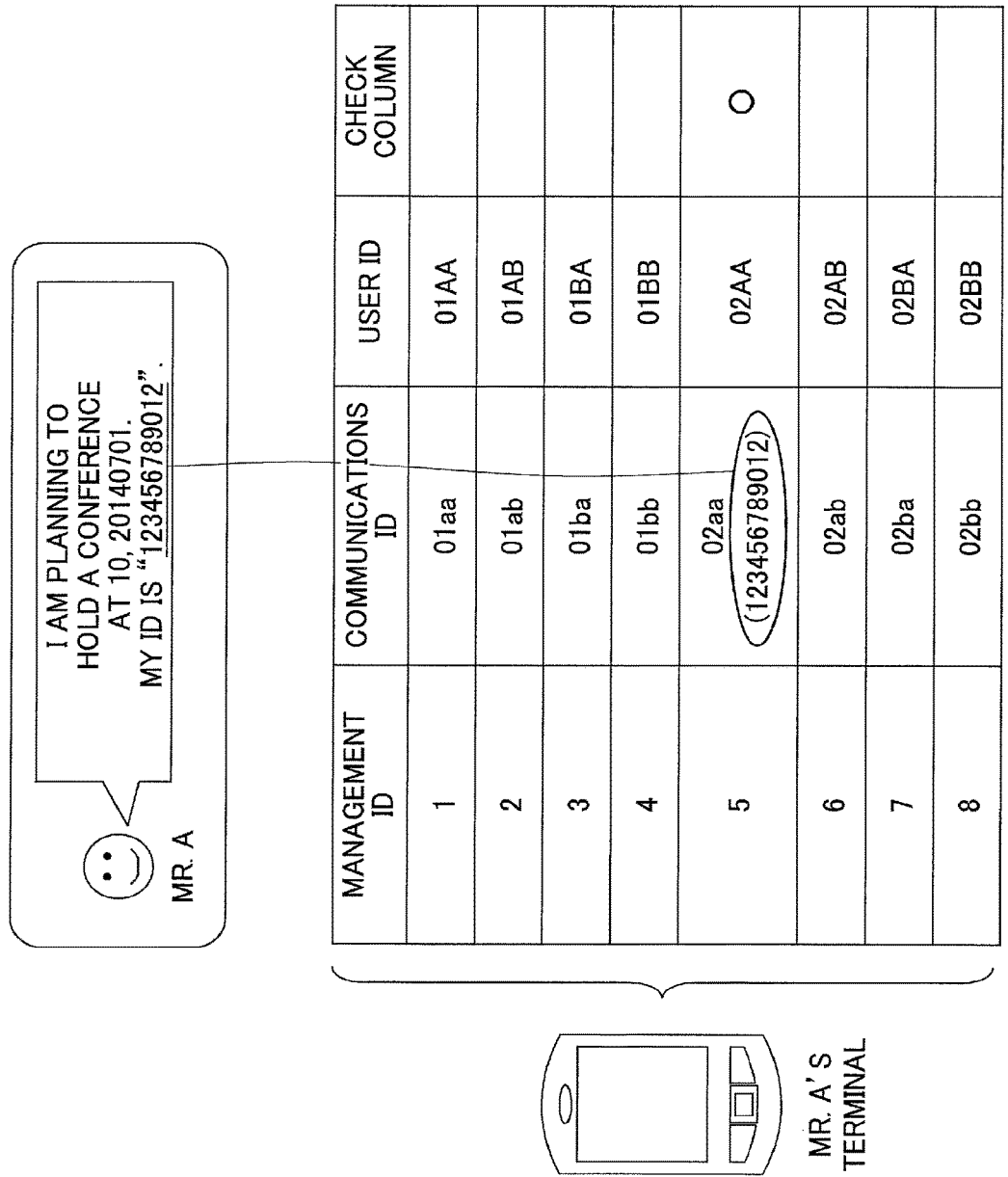
FIG. 22 is a diagram illustrating an example of a user identification information management table included in a mobile terminal, and a text message displayed on the mobile terminal.

Next, an illustration is given, with reference to FIG. 22, of matching determination of the user identification information management table held by the mobile terminal 20aa serving as the transmission source of the text message and ID. FIG. 22 is a diagram illustrating an example of the user identification information management table included in the mobile terminal 20aa, and the text message displayed on the mobile terminal 20aa. Although the mobile terminal 20aa already knows its own communications ID, this communications ID that is in association with its own user ID may be read from the user identification information management table.

Similar to the first embodiment, the ID matching determination part 41 of the mobile terminal 20aa determines whether the number assumed to be the communications ID included in the text message matches its own communications ID included in the user identification information management table.

Note that when the common information management apparatus 60 has the user identification information management DB 6005, the communications ID in the user identification information management table is registered after verifying the communications ID as a correct communications ID of the mobile terminal 20aa serving as the transmission source. When the user identification information management DB 6005 included in the mobile terminal 20aa is downloaded from the common information management apparatus 60, there is high probability that the communications ID in the user identification information management table held by the mobile terminal 20aa may be a correct one. However, even in a case where the user identification information management DB 6005 is downloaded from the common information management apparatus 60, the communications ID in the user identification information management table held by the mobile terminal 20aa is still susceptible to being edited by the user or faked by unknown people.

Further, when the user constructs the user identification information management DB 6005 included in the mobile terminal 20aa by inputting data by himself, there is no guarantee that the communications ID in the user identification information management table is a correct communications ID of the mobile terminal 20aa of the user serving as the transmission source.

Accordingly, there is provided a check column in the user identification information table. When the mobile terminal 20aa has logged into the TV conference management system $50_1$, "checked" ("o" indicates "checked" in FIG. 22) is registered in this check column. When the mobile terminal 20aa has logged into the TV conference management system $50_1$ (the user's authentication is established), the communications ID may be determined as being correct. Hence, when the "checked" is registered in the user identification information management table, the ID matching determination part 41 may be used for verifying the communications ID included in the text message.

Note that a process in which the mobile terminal 20aa logs into the TV conference management system $50_1$ is similar to the process illustrated in FIG. 16 in which the authentication result information is transmitted from the TV conference management system $50_1$ to the mobile terminal 20aa. When the authentication result information indicating a successful login is received from the TV conference management system $50_1$, the storing-reading processor 18 registers the "checked" in the check column in association with its own communications ID in the user identification information management table.

Hence, when the communications ID included in the text message and the communications ID registered in the user identification information management table are determined to be matched, it is guaranteed that the communications ID included in the text message is the communications ID of the transmission source.

Operation Process

Figure 23:
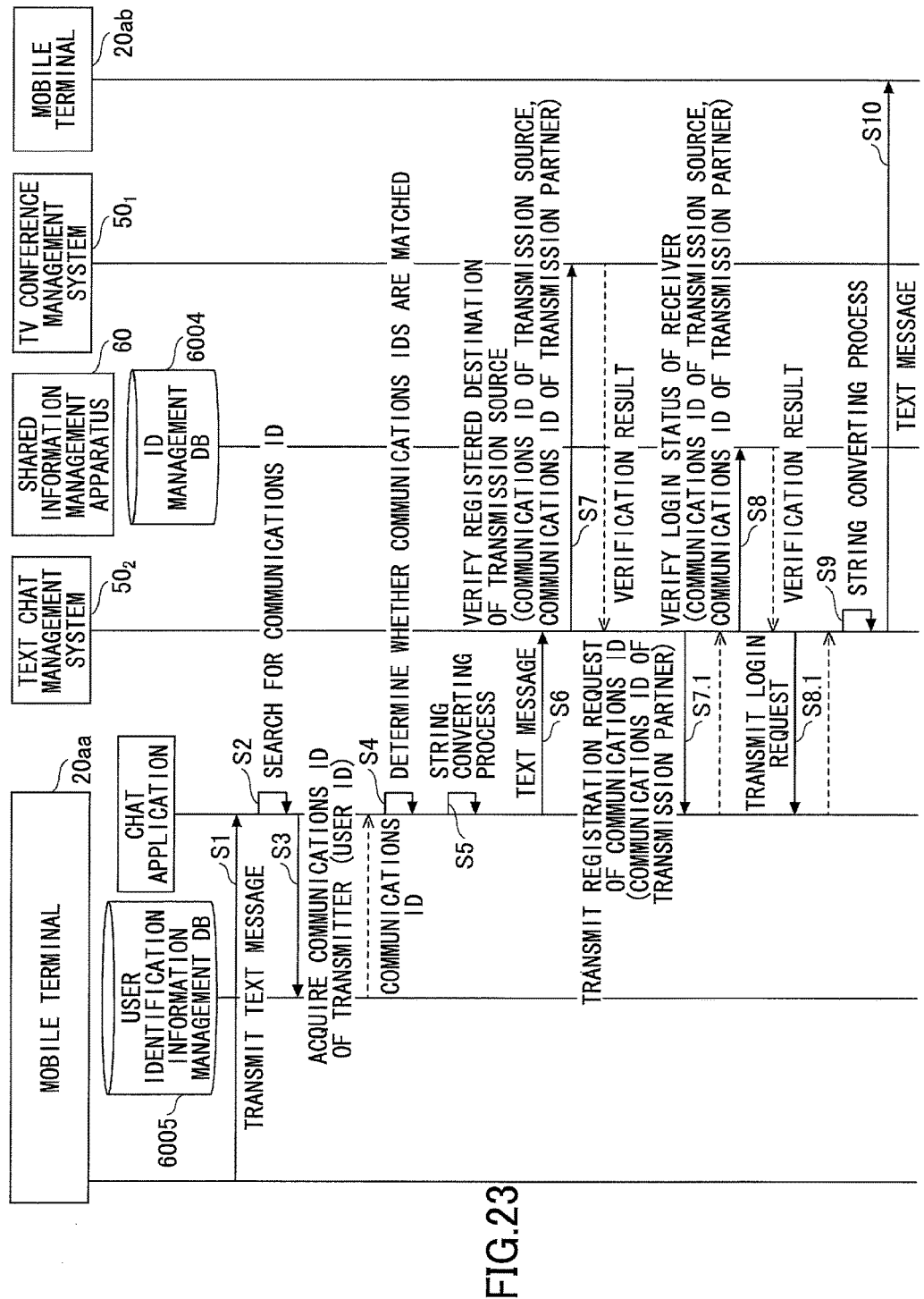
FIG. 23 is a sequence diagram illustrating an example of a process in which a mobile terminal transmits a text message including its own communications ID.

In the following, a description is given, with reference to FIG. 23, of a process in which the mobile terminal 02aa transmits the text message including its own communications ID after the mobile terminal 02aa verifies the communications ID. FIG. 23 is a sequence diagram illustrating an example of a process in which the mobile terminal 02aa transmits the text message including its own communications ID.

Note that the chat application illustrated in FIG. 23 is an example of a terminal program held by the mobile terminal 20. The chat application is caused to operate for the user to perform text chat, and includes functional components of the mobile terminal 20aa.

In step S1, the user of the mobile terminal 20aa inputs a text message to transmit the text message.

In step S2, the operations input receiver 12 of the mobile terminal 20aa acquires the text message, and the chat application acquires the text message. The ID matching determination part 41 of the chat application determines whether the communications ID is included in the text message. In this example, it is assumed that the text message includes the communications ID.

In step S3, the storing-reading processor 18 of the mobile terminal 20aa reads the communications ID in association with its own user ID from the user identification information management table of the user identification information management DB 6005.

In step S4, the ID matching determination part 41 of the mobile terminal 20aa determines whether the communications ID included in the text message matches the communications ID read from the user identification information management table. In this example, it is assumed that the communications IDs are matched.

In step S5, the link embedding part 42 of the mobile terminal 20aa performs a conversion process on a string in the text message. That is, the link embedding part 42 embeds a link for starting the conference in the communications ID included in the text message. In this stage, whether the mobile terminal 20aa is registered in the destination list of the destination list management table of the mobile terminal 20ab serving as the transmission partner, or whether the mobile terminal 20ab has logged into the TV conference management system 50₁ is unknown. Hence, the link is embedded on the assumption that the conference is ready to start.

In step S6, the transmitter-receiver 11 of the mobile terminal 20aa transmits the text message having the link embedded to the text chat management system 50₂.

In step S7, when the transmitter-receiver 51 of the text chat management system 50₂ receives the text message, the receiver terminal manager 43 requests the TV conference management system 50₁ to check the destination registration in the destination list management table. That is, the receiver terminal manager 43 requests the TV conference management system 50₁ to check whether the mobile terminal 20aa serving as the transmission source is registered in association with the mobile terminal 20ab of the transmission partner in the destination list of the destination list management table. The receiver terminal manager 43 requests the TV conference management system 50₁ to check whether the mobile terminal 20ab serving as the transmission partner is registered in association with the mobile terminal 20aa of the transmission source in the destination list of the destination list management table.

In step S7.1, when the communications ID of the mobile terminal 20ab is not registered in the destination list of the mobile terminal 20aa, the receiver terminal manager 43 requests the mobile terminal 20aa to register the communications ID of the mobile terminal 20ab in the destination list management table. In step S8, the receiver terminal manager 43 refers to the ID management table to acquire login statuses of the mobile terminal 20aa and the mobile terminal 20ab in the TV conference management system 50₁.

In step S8.1, when the operating status of the mobile terminal 20aa is offline, the receiver terminal manager 43 requests the mobile terminal 20aa to log into the TV conference system 50₁.

In step S9, the link embedding part 42 of the text chat management system 50₂ performs a conversion process on a string in the text message.

When the destination is already registered and the mobile terminal 20aa is already in a login status, a link will not be embedded (as the mobile terminal already has the embedded link).

When the destination is not registered, a link for registering the destination will be embedded.

When the destination is registered but the mobile terminal 20aa has not logged in, a link in a login-screen will be embedded.

In step S10, the transmitter-receiver 51 of the text chat management system 50₂ transmits the text message to the mobile terminal 20ab serving as the transmission partner.

Hence, in the transmission system 1 according to the second embodiment, since the mobile terminal 20aa serving as the transmission source of the text message determines whether the communications IDs are matched, it may be possible to prevent burdens on the text chat management system 50₂ from increasing.

Preferred Modification

The preferred embodiments and examples are described above; however, the present invention is not limited to those embodiments and examples. Various alteration and modification may be made within the scope without departing from the gist of the present invention.

For example, various types of databases included in the common information management apparatus 60 may be held by the transmission system 50.

Further, the nonvolatile storages 5000, 1000, and 6000 may be located anywhere insofar as the nonvolatile storages 5000, 1000, and 6000 are accessible by the common information management apparatus 60 via the communications network 2.

In addition, there may be multiple TV conference management systems 50₁ and multiple text chat management systems 50₂ in the transmission system 1. Moreover, some functional components of the multiple TV conference management systems 50₁ and functional components of the multiple text chat management systems 50₂ may be held by different apparatuses.

Further, the transmission system 1 according to the above described embodiments and modification is illustrated by giving the examples of the TV conference system and the text chat system; however, a combination of any of a telephony system, an SNS (social network service), and an electronic mail system may be applied to the transmission system 1.

According to the above-described embodiments and modification, it may be possible to provide a transmission system in which the receiver side may be able to determine whether information included in the transmitted data is correct.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as a general purpose computer, a personal digital assistant, a mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, a hard disk, a CD ROM, a magnetic tape device or a solid state memory device.

The hardware platform includes any desired kind of hardware resources including, for example, a central processing unit (CPU), a random access memory (RAM), and a hard disk drive (HDD). The CPU may be implemented by any desired kind of any desired number of processors. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The present invention is not limited to the specifically disclosed embodiments, and variations and modifications may be made without departing from the scope of the present invention.

The present application is based on and claims the benefit of priority of Japanese Priority Application No. 2014-206078 filed on Oct. 7, 2014, the entire contents of which are hereby incorporated herein by reference.

What is claimed is:

1. A transmission system including a first transmission terminal and a second transmission terminal, the first transmission terminal transmitting text message data to the second transmission terminal, the transmission system comprising:
   processing circuitry configured to
      establish first data communications between the first transmission terminal specified by first identification information that identifies the first transmission terminal within a first communication system, which is a text message communication system, and the second transmission terminal specified by second identification information,
      refer to a memory that stores registered information registering third identification information, which identifies the first transmission terminal within a second communication system, in association with the first identification information of the first transmission terminal to acquire, from the memory, the third identification information associated with the first identification information,
      determine whether the acquired third identification information is included in the text message data transmitted by the first transmission terminal, and
      add, to the text message data, a first link for initiating communication within the second communication system, when it is determined that the acquired third identification information is included in the text message data,
   wherein when it is determined that the text message data includes the third identification information, the processing circuitry adds, to the text message data, information indicating that the third identification information included in the transmission data is correct, and
   wherein the second communication system is a video conferencing system, and the memory associates the third identification information that identifies the first transmission terminal within the text message communication system with the third identification information that identifies the first transmission terminal within the video conferencing system.

2. The transmission system as claimed in claim 1, wherein the processing circuitry is further configured to:
   identify whether the third identification information is included in destination terminal registered information that registers a destination terminal of the second transmission terminal in association with fourth identification information, by acquiring the fourth identification information registered in association with the second identification information of the second transmission terminal in the registered information, and
   when the processing circuitry determines that the third identification information is not included in the destination terminal registered information, the processing circuitry adds, to the text message data, a second link to register the third identification information to the destination terminal registered information, in addition to adding the first link.

3. The transmission system as claimed in claim 2, wherein the processing circuitry is further configured to identify whether the fourth identification information is included in the destination terminal registered information that registers a destination terminal of the first transmission terminal in association with the third identification information by referring to the registered information, and
   when the processing circuitry determines that the fourth identification information is not included in the destination terminal registered information, the processing circuitry requests the first transmission terminal to register the fourth identification information in the destination terminal registered information.

4. The transmission system as claimed in claim 1, wherein the processing circuitry is further configured to
   determine whether the second transmission terminal associated with the second identification information has logged into the second communication system that establishes second data communications between two or more transmission terminals, by referring to the registered information, to acquire the fourth identification information in association with the second identification information, and
   when the processing circuitry determines that the second transmission terminal associated with the fourth identification information has not logged into the second communication system, the processing circuitry adds, to the text message data, a second link to log the second transmission terminal into the second communication system, in addition to adding the first link.

5. A transmission terminal transmitting text message data to a second transmission terminal, the transmission terminal comprising:
   processing circuitry configured to
      request an external apparatus to establish first data communications between the transmission terminal, which is specified by first identification information that identifies the transmission terminal within a first communication system, which is a text message communication system, and the second transmission terminal, which is specified by second identification information;
      refer to a memory that stores registered information registering third identification information, which identifies the transmission terminal within a second communication system, in association with the first identification information to acquire, from the memory, the third identification information associated with the first identification information,
      determine whether the acquired third identification information is included in the text message data transmitted by the transmission terminal, and
      add, to the text message data, a first link for initiating communication within the second communication system, when it is determined that the acquired third identification information is included in the text message data; and a transmitter configured to transmit the text message data to which the processing circuitry has added the first link, wherein when it is determined that the text message data includes the third identification information, the processing circuitry adds, to the text message data, information indicating that the third identification information included in the transmission data is correct, and wherein the second communication system is a video conferencing system, and the memory associates the third identification information that identifies the first transmission terminal within the text message communication system with the third identification information that identifies the first transmission terminal within the video conferencing system.

6. A communications method for transmitting text message data from a first transmission terminal to a second transmission terminal, the communications method comprising:

establishing first data communications between the first transmission terminal specified by first identification information that identifies the first transmission terminal within a first communication system, which is a text message communication system, and the second transmission terminal specified by second identification information;

accessing a memory that stores registered information registering third identification information, which identifies the first transmission terminal within a second communication system, in association with the first identification information to acquire, from the memory, the third identification information associated with the first identification information;

determining whether the acquired third identification information is included in the text message data transmitted by the first transmission terminal; and adding, to the text message data, a first link for initiating communication within the second communication system, when it is determined that the acquired third identification information is included in the text message data, wherein when it is determined that the text message data includes the third identification information, the adding step includes adding, to the text message data, information indicating that the third identification information included in the transmission data is correct, and wherein the second communication system is a video conferencing system, and the memory associates the third identification information that identifies the first transmission terminal within the text message communication system with the third identification information that identifies the first transmission terminal within the video conferencing system.

7. The communications method as claimed in claim 6, further comprising:

identifying whether the third identification information is included in destination terminal registration information that registers a destination terminal of the second transmission terminal in association with fourth identification information by acquiring the fourth identification information registered in association with the second identification information of the second transmission terminal in the registered information, and when determining that the third identification information is not included in the destination terminal registered information, adding, to the text message data, a second link to register the third identification information to the destination terminal registered information, in addition to adding the first link.

8. The communications method as claimed in claim 7, further comprising identifying whether the fourth identification information is included in the destination terminal registered information that registers a destination terminal of the first transmission terminal in association with the third identification information by referring to the registered information, and when determining that the fourth identification information is not included in the destination terminal registered information, requesting the first transmission terminal to register the fourth identification information in the destination terminal registered information.

9. The communications method as claimed in claim 6, further comprising:

determining whether the second transmission terminal associated with the second identification information has logged into the second communication system that establishes second data communications between two or more transmission terminals, by referring to the registered information, to acquire the fourth identification information in association with the second identification information, and when determining that the second transmission terminal associated with the fourth identification information has not logged into the second communication system, adding, to the text message data, a second link to log the second transmission terminal into the second communication system, in addition to adding the first link.

* * * * *